(12) United States Patent
Klimpel et al.

(10) Patent No.: US 9,023,914 B2
(45) Date of Patent: May 5, 2015

(54) NITRILE RUBBERS AND PRODUCTION THEREOF IN ORGANIC SOLVENTS

(75) Inventors: Michael Klimpel, Langenfeld (DE); Sven Brandau, Strasbourg (FR); Uwe Westeppe, La Wantzenau (FR); Christopher Barner-Kowollik, Stutensee-Blankenloch (DE); Andreas Kaiser, Strasbourg (FR)

(73) Assignee: LANXESS Deutschland GmbH, Cologne (DE)

( * ) Notice: Subject to any disclaimer, the term of this patent is extended or adjusted under 35 U.S.C. 154(b) by 242 days.

(21) Appl. No.: 13/395,950

(22) PCT Filed: Aug. 31, 2010

(86) PCT No.: PCT/EP2010/062728
§ 371 (c)(1),
(2), (4) Date: Jul. 20, 2012

(87) PCT Pub. No.: WO2011/032832
PCT Pub. Date: Mar. 24, 2011

(65) Prior Publication Data
US 2012/0283351 A1  Nov. 8, 2012

(30) Foreign Application Priority Data

Sep. 17, 2009  (EP) .................................... 09170583
May 7, 2010  (EP) .................................... 10290249

(51) Int. Cl.
| | | |
|---|---|---|
| C08L 21/00 | (2006.01) | |
| C08L 33/20 | (2006.01) | |
| C08C 19/02 | (2006.01) | |
| C08C 19/20 | (2006.01) | |
| C08L 15/00 | (2006.01) | |
| C08L 19/00 | (2006.01) | |
| C08L 35/00 | (2006.01) | |

(52) U.S. Cl.
CPC .............. *C08L 15/005* (2013.01); *C08C 19/02* (2013.01); *C08C 19/20* (2013.01); *C08L 19/006* (2013.01); *C08L 35/00* (2013.01)

(58) Field of Classification Search
USPC ............ 522/162; 528/360; 524/607; 525/189
See application file for complete search history.

(56) References Cited

U.S. PATENT DOCUMENTS

| | | | |
|---|---|---|---|
| 3,875,201 A * | 4/1975 | Mayer-Mader et al. ...... 558/244 |
| 5,807,941 A * | 9/1998 | Tsuji et al. .................... 526/224 |
| 7,230,063 B1 | 6/2007 | Parker |
| 7,714,075 B1 | 5/2010 | Le et al. |
| 7,851,582 B2 | 12/2010 | Lai |
| 8,492,576 B2 * | 7/2013 | Lai et al. ........................ 558/243 |
| 2006/0205881 A1 | 9/2006 | Gozdiff et al. |
| 2008/0064822 A1 | 3/2008 | Obrecht et al. |
| 2008/0139764 A1 | 6/2008 | Le et al. |
| 2008/0153982 A1 | 6/2008 | Lai et al. |
| 2012/0108757 A1 * | 5/2012 | Musashi et al. ............... 525/261 |

FOREIGN PATENT DOCUMENTS

| | | |
|---|---|---|
| EP | 0471250 A1 | 2/1992 |
| GB | 1558491 A | 3/1977 |
| JP | 09087480 A | 3/1997 |
| WO | 2007003782 A2 | 1/2007 |

OTHER PUBLICATIONS

Hofmann, D. "Molecular Modeling Investigation of Free Volume Distributions in Stiff Chain Polymers with Conventional and Ultrahigh Free Volume: Comparison between Molecular Modeling and Positron Lifetime Studies", Macromolecules 2003, 36, pp. 8528-8538.

Liu, X. "Well-defined higher-molecular-weight polyacrylonitrile via RAFT technique in the presence of disulfide compounds as a source of chain transfer agent", European Polymer Journal, 2008, 44 (4) pp. 1200-1208.

Liu, X. "Dibenzyl Trithiocarbonate Mediated Reversible Addition-Fragmentation Chain Transfer Polymerization of Acrylonitrile", Journal of Polymer Science, Part A: Polymer Chemistry (2005), 44 (1), pp. 490-498.

Lebreton, P. "Use of Original Perfluorinated Dithioesters for the Synthesis of Well-controlled Polymers by Reversible Addition-Fragmentation Chain Transfer (RAFT)", Macromolecular Chemistry & Physics, (2002), 203 (3), pp. 522-537.

European Search Report from co-pending Application EP09170583, 3 pages.

* cited by examiner

*Primary Examiner* — Robert D. Harlan
(74) *Attorney, Agent, or Firm* — Jennifer R. Seng

(57) ABSTRACT

A new process is provided for preparing nitrile rubbers by free-radical polymerization in an organic solvent and in the presence of specific modifier substances. This polymerization may be followed by hydrogenation to give likewise new hydrogenated nitrile rubbers, the hydrogenation advantageously taking place likewise in organic solvent. The optionally hydrogenated nitrile rubbers obtained are notable for having fragments of the employed modifier substances in the main polymer chain and/or as end groups. They can be prepared with a wide diversity of molecular weights and polydispersity indices, especially with very low polydispersity indices.

18 Claims, 2 Drawing Sheets

ESI-MS of NBR #5 (Mn = 6600, PDI = 1.31)

Extract of ESI-MS of NBR #5

Structure of RAFT-NBR #7 from Example 7

NITRILE RUBBERS AND PRODUCTION THEREOF IN ORGANIC SOLVENTS

The present patent application claims the right of priority under 35 U.S.C. §119 (a)-(d) and 35 U.S.C. §365 of International Application No. PCT/EP2010/62728, filed 31 Aug. 2010, which was published in German as International Patent Publication No. WO2011/032832A1 on 2 Mar. 2011, which is entitled to the right of priority of European Patent Application No.'s EP09170583.0 and EP10290249.1, each respectively filed on 17 Sep. 2009 and 7 May 2010.

The present invention relates to a process for preparing nitrile rubbers by free-radical polymerization, carried out in solution and in the presence of specific modifier compounds, and also to new nitrile rubbers which, in the main polymer chain or at the chain ends, have structural elements originating from the modifier compounds, and to a process for hydrogenating such nitrile rubbers, and to the corresponding hydrogenated nitrile rubbers.

Nitrile rubbers, also referred to in abbreviated form as "NBR", are rubbers which are copolymers or terpolymers of at least one $\alpha,\beta$-unsaturated nitrile, at least one conjugated diene and optionally one or more further copolymerizable monomers. Hydrogenated nitrile rubbers ("HNBR") are corresponding copolymers or terpolymers in which some or all of the C=C double bonds of the copolymerized diene units have undergone hydrogenation.

Both NBR and HNBR have for many years occupied a firm place in the field of specialty elastomers. They possess an excellent profile of properties, in the form of excellent oil resistance, good heat resistance and outstanding resistance towards ozone and chemicals, the latter even more pronounced in the case of HNBR than of NBR. NBR and HNBR, furthermore, possess very good mechanical properties and performance properties. On this basis they find broad use in a wide variety of application fields, and are employed, for example, in the production of seals, hoses, belts and damping elements in the automotive sector, and also for stators, borehole seals and valve seals in the oil extraction sector, and also for numerous parts in the electrical industry and in mechanical and marine engineering. A large number of different grades are available commercially, and, according to area of application, feature different monomers, molecular weights and polydispersities and also different mechanical and physical properties. In addition to the standard grades, specialty grades, in particular, characterized by specific termonomer contents or special functionalizations, are increasingly in demand.

In terms of the practical use of the (H)NBR rubbers, increasing importance is also being given to the vulcanization of the rubbers, i.e., in particular, to the crosslinker system and to the vulcanizing conditions. For instance, in addition to the conventional rubber crosslinking systems that have existed for a number of decades already, based on peroxides and on sulphur, recent years have seen the development of a variety of new approaches to alternative crosslinking. Crosslinking approaches of this kind also include polymers which, owing to their functional groups, are not amenable to all forms of crosslinking and all crosslinking agents and which therefore represent a particular challenge.

Industrially, nitrile rubbers are produced almost exclusively by what is called emulsion polymerization. For this process, the molecular weight, and hence also the viscosity, of the resultant nitrile rubber is usually regulated using dodecyl mercaptans, especially tertiary dodecyl mercaptans (abbreviated to "TDDM" or else "TDM"). Following the polymerization, the resultant NBR latex is coagulated in a first step, and the NBR solid is isolated from it. Where further hydrogenation of the nitrile rubber to HNBR is desired, this hydrogenation takes place likewise by known methods of the prior art, as for example using homogeneous or heterogeneous hydrogenation catalysts. The catalysts are based typically on rhodium, ruthenium or titanium. It is, however, also possible for platinum, iridium, palladium, rhenium, ruthenium, osmium, cobalt or copper to be used, either in the form of a metal or else, preferably, in the form of metal compounds.

On the industrial scale, these kind of hydrogenation reactions of NBR to HNBR are carried out typically in homogeneous phase, i.e. in an organic solvent. Suitable catalysts and solvents for this purpose are known from, for example, DE-A 25 39 132 and EP-A 0 471 250. The catalyst known as the Wilkinson catalyst, in particular, has proved to be suitable for selective hydrogenation of nitrile rubbers in the organic solvent monochlorobenzene. In order for this hydrogenation to be carried out in an organic medium, therefore, the nitrile rubber obtained in aqueous emulsion after the polymerization must first be isolated. This is a costly and inconvenient procedure in terms both of the process and the apparatus, and hence economically as well is not of unalloyed attraction.

Added to this is the fact that, in the course of hydrogenation of nitrile rubbers, a quite considerable (typically involving a factor of 2 or more) increase in viscosity (known as the Mooney jump, often referred to in the literature as Mooney Increase Ratio ("MIR")) can be observed. For this reason, prior to hydrogenation, in a further step, nitrile rubbers must sometimes be subjected to a molecular weight reduction (e.g. by metathesis) in order to allow the ultimate attainment of a hydrogenated nitrile rubber having not too high a molecular weight and not too high a viscosity. On the synthesis pathways which have been disclosed to date and can be implemented industrially there are also limits, to a certain extent, on the possibilities of influencing the polydispersity.

Consequently there have already been a wide variety of attempts to optimize the preparation processes for NBR and HNBR. Attempts have thus been made to carry out the polymerization to give the nitrile rubber in organic solution. Hitherto, however, these studies have held out no great prospect of success, and a true industrial implementation of such processes is known neither from the literature nor from industry to date. In the abstract of the Dissertation by C. Hollbeck, Universität-Gesamthochschule Essen, 1995, page II, the following is observed concerning the copolymerization of acrylonitrile and 1,3-butadiene in organic solution (quote): "with a numerical average for the degree of polymerization, Pn, of 1589 (molecular weight (Mn)=~85 800 g/mol) and a conversion of 40.5%, the objectives set were realized in 40 hours at a reaction temperature of 343 K. A reduction in time to 18 hours was possible only if the target conversion was reduced. As trial experiments show, under the prevailing conditions, and even by increasing the temperature to 353 K, a combination of Pn≥1400 and conversion greater than 40% is not in the realm of the possible." A restriction in attainable conversion to just 40% within a reaction time of 40 hours mean that the organic solution polymerization process described there is inappropriate for industrial practice, both technically and economically.

Against the background outlined above, the problem addressed by the present invention was therefore, firstly, that of providing new, optionally hydrogenated nitrile rubbers which permit the construction of particular polymer architectures and microstructures and hence allow the setting of particular profiles of properties for the subsequent applications, and also permit simple crosslinking. Secondly, and at the same time, the intention was to solve the problem of making these specific new nitrile rubbers available with a broad range of molecular weights and polydispersities, and also, in the next step, making the corresponding hydrogenated nitrile rubbers available via an extremely simple preparation process.

Surprisingly it has been found that it is possible to prepare new, optionally hydrogenated nitrile rubbers by free-radical polymerization in solution, using specific RAFT modifiers and, optionally, a subsequent hydrogenation reaction.

The invention provides new nitrile rubbers comprising
(i) repeating units derived from at least one conjugated diene, at least one α,β-unsaturated nitrile and optionally one or more further copolymerizable monomers, and
(ii) one or more structural elements of the general formulae (I), (II), (III), (IV) or (V)

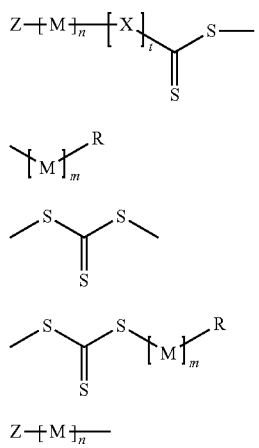

in which
Z is H, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulphamoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides,
R (a), if m≠0, may possess the same definitions as the moiety Z, and
(b), if m=0, is H, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, carbamoyl, alkoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides,
M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides,
n and m are alike or different and are each in the range from 0 to 10 000,
t is 0 or 1, if n=0, and is 1, if n≠0, and
X is $C(Z_2)$, $N(Z)$, $P(Z)$, $P(=O)(Z)$, O, S, $S(=O)$ or $S(=O)_2$, it being possible for Z in these moieties to possess the same definitions as set out above.

For the purposes of this specification, the term "nitrile rubber(s)" should be interpreted broadly, and encompasses not only the nitrile rubbers but also hydrogenated nitrile rubbers. Where hydrogenated nitrile rubbers are concerned, the above formulation "nitrile rubbers comprising repeating units derived from" means, therefore, that the repeating units originating from the conjugated diene are units in which some or all of the C=C double bonds present initially in the polymer after the polymerization have undergone hydrogenation.

Where the present specification uses the term "substituted", this means that a hydrogen atom on an indicated moiety or atom has been replaced by one of the indicated groups, with the proviso that the valency of the indicated atom is not exceeded, and always only under the condition that this substitution leads to a stable compound.

The invention further provides a process for preparing nitrile rubbers, whereby
a) first of all a free-radical polymerization of at least one conjugated diene, at least one α,β-unsaturated nitrile and optionally one or more further copolymerizable monomers is carried out in the presence of at least one organic solvent and at least one modifier, and
b) optionally, subsequently, a hydrogenation,
with as modifier at least one compound of the general structural formula (VI) being used,

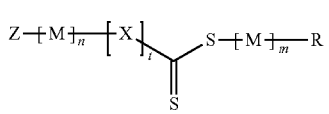

in which
is H, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulpharnoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides,
R (a), if m≠0, may possess the same definitions as the moiety Z, and
(b), if m=0, is H, a linear or branched, saturated, mono- or polyunsaturated alkyl moiety, a saturated, mono- or polyunsaturated carbocyclyl or heterocyclyl moiety, aryl, heteroary, arylalkyl, heteroarylalkyl, alkoxy, aryloxy, heteroaryloxy, amino, amido, carbamoyl, alkoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides, M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides, n and m are alike or different and are each in the range from 0 to 10 000, t is 0 or 1, if n=0, and is 1, if n≠0, and X is $C(Z_2)$, N(Z), P(Z), P(=O)(Z), O, S, S(=O) or $S(=O)_2$, it being possible for Z in these moieties to possess the same definitions as set out above for the formula (VI).

The optionally hydrogenated nitrite rubbers of the invention are notable for the presence of one or more structural elements of the general formulae (I), (II), (IV) or (V) either in the main polymer chain or as end groups. On the basis of these structural elements/end groups, optionally hydrogenated nitrite rubbers of this kind can be subjected to follow-on reactions with other polymerizable monomers, since the structural elements/end groups are able, via further fragmentation, to act as RAFT agents. In this way, the targeted construction of a wide variety of polymer architectures becomes possible. Furthermore, these optionally hydrogenated nitrite rubbers of the invention are also easier to crosslink than conventional nitrite rubbers, since the structural elements/end groups are structurally similar to the typical crosslinking agents, especially those based on sulphur. With the optionally hydrogenated nitrite rubbers of the invention, consequently, a sufficient crosslinking density can be achieved even with a smaller amount of crosslinker. Moreover, the crosslinking via the end groups reduces the number of loose polymer chain ends in the vulcanizate, resulting in improved properties such as the dynamic properties, for example.

The fact that free-radical polymerization to give the nitrite rubber in organic solution is possible at all was completely unexpected to a skilled person, since all previous investigations into the solution polymerization of NBR did not result in reasonable success.

The above-described modifier compounds are known from what is called the RAFT technology. This technology is already in use in the synthesis of various polymers (WO-A-01/60792, U.S. Pat. No. 7,230,063 B1, WO-A-2007/003782, US-A-2008/0153982, WO-A-2005/061555).

WO-A-98/01478 describes the preparation of a wide variety of homopolymers and copolymers. Examples of homopolymers synthesized include poly(meth)acrylates, poly(meth)acrylic acid, polyacrylamides and polystyrene. Examples of block copolymers prepared include poly(methyl acrylate-block-ethyl acrylate), poly(n-butyl acrylate-block-acrylic acid), poly(4-methylstyrene-block-styrene), poly(styrene-block-acrylamide), poly(methyl methacrylate-block-styrene), poly(acrylonitrile-co-styrene) (Example 67), poly (styrene-co-butadiene) (Example 69) and others. Copolymerization of a conjugated diene, especially 1,3-butadiene, with an α,β-unsaturated nitrile, especially acrylonitrile, is neither described nor suggested in WO-A-98/01478, however.

The preparation of pure polyacrylonitrile (PAN) by RAFT technology is already known. Preliminary trials are known from Macromolecules 2003, 36, 8537, in which polyacrylonitrile was obtained with only low molecular weights of up to 16 000 gm/mol and narrow molecular weight distributions of approximately 1.1. Since then, other studies have been carried out in which it has been possible to prepare polyacrylonitrile by RAFT polymerization with reasonable results. This process is described in references including European Polymer Journal (2008), 44(4), 1200-1208 (Xiao-hui Liu, Gui-bao Zhang, Bai-xiang Li, Yun-gang Bai, Ding Pan and Yue-sheng Li). There it was possible using RAFT technology to obtain polyacrylonitrile of high molecular weight (Mn>200 000 g/mol) and of low polydispersity index (PDI~1.7) in solution, using bis(thiobenzoyl) disulphide or bis(thiophenylacetoyl)disulphide, as precursors for the in situ-generated modifiers 2-cyanoprop-2-yl dithiobenzoate and 2-cyanoprop-2-yl dithiophenylacetate. As described in Journal of Polymer Science, Part A: Polymer Chemistry (2005), 44(1), 490-498 in contrast, the use of dibenzyl trithiocarbonates as RAFT modifiers for the homopolymerization of acrylonitrile results only in polymers having low molecular masses ($M_n$) of <30 000 g/mol, even if the polydispersities are between 1.02 and 2.35. From Macromolecular Chemistry and Physics (2002), 203(3), 522-537, furthermore, it is known that the homopolymerization of 1,3-butadiene by RAFT technology yields only polymers having low molecular weights: the molecular weights ($M_n$) achieved are even lower than in the case of the aforementioned preparation of polyacrylonitrile with dibenzyl trithiocarbonates as RAFT modifiers, and are a maximum of 10 500 g/mol in conjunction with a high polydispersity of 3.40. In fact it is also possible here to obtain significantly lower polydispersities, of down to 1.24, but only with substantial detractions from the molecular weight ($M_n$), to just 1300 g/mol.

For nitrile rubbers having repeating units of at least one conjugated diene, at least one α,β-unsaturated nitrile and optionally one or more further copolymerizable monomers, the possibility of applying the RAFT. technology has been neither described nor anywhere suggested to date. The fact that the use of what are called RAFT modifiers in NBR polymerization would result in success was in fact entirely unexpected, particularly against the background of the above-described investigations into the preparation of polybutadiene (Macromolecular Chemistry and Physics (2002), 203(3), 522-537), which result merely in molecular weights in technically disadvantageous orders of magnitude (industrially utilizable butadiene-based polymers generally require a molecular weight Mn>50 000 g/mol, the same being true of random copolymers based on acrylonitrile and butadiene).

With the process of the invention it is possible, within time periods comparable with those of the conventional emulsion polymerization for NBR preparation, to obtain conversions which make the process suitable for industrial implementation. For instance, in a polymerization time of less than 10 hours, a conversion of 50% is already achievable, in conjunction with industrially acceptable molecular weights (Mn>50 000 g/mol) and with—in comparison to conventional emulsion NBR—hitherto unachievedly low polydispersities of significantly less than 2.0.

DETAILED DESCRIPTION

Figure 1:
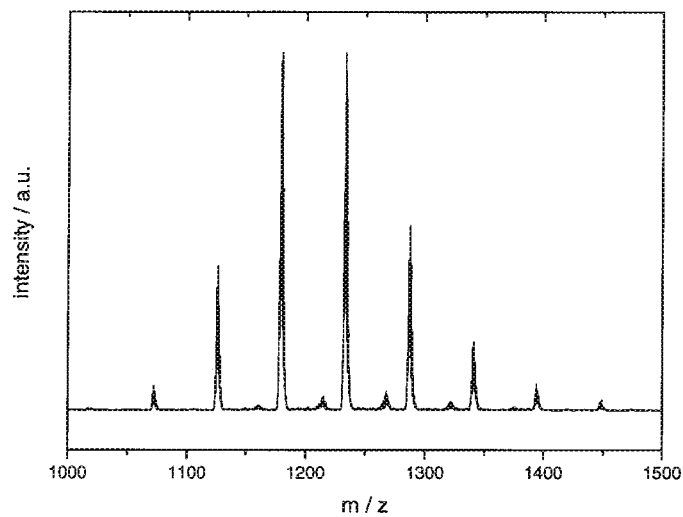
FIG. 1 depicts the mass spectrum of the NBR prepared in accordance with Example 5.
Figure 2:
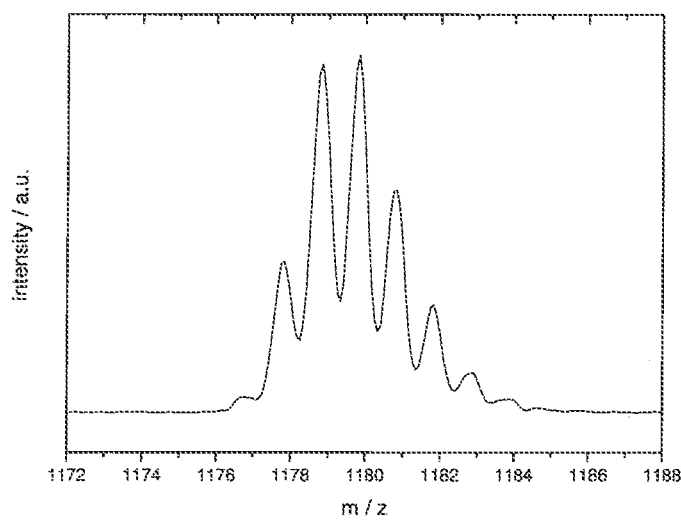
FIG. 2 depicts an extract of the mass spectrum of the NBR prepared in accordance with Example 5.

The process of the invention uses at least one modifier of the above-stated general formula (VI).

The definitions stated in the moieties Z and R of the general formula (VI) may in each case be singly or multiply substituted. The following moieties preferably have single or multiple substitution: alkyl, carbocyclyl, heterocyclyl, aryl, heteroaryl, arylalkyl, heteroarylalkyl, alkoxy, aryloxy, alkylthio, arylthio, amino, amido, carbamoyl, phosphonato, phosphinato, sulphanyl, thiocarboxyl, sulphinyl, sulphono, sulphino, sulpheno, sulphamoyl, silyl, silyloxy, carbonyl, carboxyl, oxycarbonyl, oxysulphonyl, oxo, thioxo, borates, selenates and epoxy.

Suitable substituents include in turn—provided that chemically stable compounds are formed—all of the definitions which Z is able to adopt. Particularly suitable substituents are halogen, preferably fluoro, chloro, bromo or iodo, nitrile (CN) and carboxyl.

The definitions stated for Z and R in the general formula (VI) also, explicitly, include salts of the stated moieties, where these are chemically possible and stable. These may be, for example, ammonium salts, alkali metal salts, alkaline earth metal salts, aluminium salts or protonated forms of the modifiers of the general formula (VI).

The definitions given for Z and R in the general formula (VI) also include organometallic moieties, examples being those which give the modifier a Grignard function. Z and R, furthermore, may represent or contain a carbanion, with lithium, zinc, tin, aluminium, lead and boron as counterion.

A further possibility is for the modifier to be coupled by the moiety R, via a linker, to a solid phase or support substance. The linker may be a Wang, Sasrin, Rink acid, 2-chlorotrityl, Mannich, Safety Catch, Traceless or photolabile linker known to a person skilled in the art. Examples of suitable solid phases or support substances include silica, ion exchange resins, clays, montmorillonites, crosslinked polystyrene, polyethylene glycol grafted onto polystyrene, polyacrylamides ("Pepsyn"), polyethylene glycol-acrylamide copolymers (PEGA), cellulose, cotton, and granulated porous glass (CPG, controlled pore glass).

A further possibility is for the modifiers of the general formula (VI) to function as ligands for organometallic complex compounds, as for example for those based on the central metals rhodium, ruthenium, titanium platinum, iridium, palladium, rhenium, ruthenium, osmium, cobalt, iron or copper.

The definitions given for the moiety "M" in the above-stated general formula (VI) may be singly or multiply substituted. Consequently M may represent repeating units of one or more, mono- or poly-unsaturated monomers, preferably optionally singly or multiply substituted, conjugated or non-conjugated dienes, optionally singly or multiply substituted alkynes, or optionally singly or multiply substituted vinyl compounds, examples being fluorinated mono- or polyunsaturated vinyl compounds, or else may represent a divalent structural element which derives from substituted or unsubstituted polymers comprising polyethers, more particularly polyalkylene glycol ethers and polyalkylene oxides, polysiloxanes, polyols, polycarbonates, polyurethanes, polyisocyanates, polysaccharides, polyesters and polyamides. Behind these moieties "M", therefore, there may lie a monomeric or polymeric moiety.

It is preferred to use a modifier of the general formula (VI) wherein
Z and R possess the definitions stated above for the general formula (VI), and
n, m and t are all zero.

This preferred modifier therefore possesses the general structure (VIa):

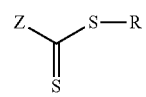

(VIa)

wherein the moieties Z and R may have any of the definitions stated above for the general formula (VI).

Trithiocarbonates:

As a further preferred modifier it is possible to use a modifier of the general formula (VIb)

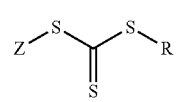

(VIb)

wherein
Z possesses the definitions stated above for the general formula (VI),
R possesses the definitions stated above for the general formula (VI) for the variant b) with m=0, albeit with the restriction that R, following homolytic fission of the S—R bond, forms alternatively a secondary, tertiary or aromatically stabilized radical.

This particularly preferred modifier of the general formula (VIb) is a product of the modifier of the general formula (VI) with
n and m each =0,
t is 1,
X is sulphur,
Z possesses the definitions stated above for the general formula (VI), and
R possesses the definitions stated above for the general formula (VI) for the variant b) with m=0, albeit with the restriction that R, following homolytic fission of the S—R bond, forms alternatively a secondary, tertiary or aromatically stabilized radical.

With these particularly preferred modifiers of the general formula (VIb), therefore, depending on whether Z and R are identical or not in the context of the given definitions, are symmetrical or asymmetrical trithiocarbonates.

Particular preference is given to using a modifier of the general formula (VIb) where
Z possesses the definitions stated above for the general formula (VI), and
R, with the proviso that R, after homolytic fission of the S—R bond, forms alternatively a secondary, tertiary or aromatically stabilized radical, is
  a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or
  a saturated or mono- or polyunsaturated, optionally singly or multiply substituted carbocyclyl or heterocyclyl moiety, more particularly cyclohexyl, cumyl or cyclohexane-1-nitrile-1-yl,
  a (hetero)aryl moiety, very preferably a $C_6$-$C_{24}$-(hetero)aryl moiety, more particularly phenyl, pyridinyl or anthracenyl,
  a (hetero)aralkyl moiety, very preferably benzyl, phenylethyl or 1-methyl-1-phenyleth-2-yl, or
  thiocarboxyl, carbonyl, carboxyl, oxo, thioxo, epoxy, and also salts of the aforementioned compounds.

More particular preference is given, furthermore, to using a modifier of the general formula (Vth) wherein Z possesses the definitions stated above for the general formula (VI), albeit likewise with the additional restriction to those definitions whereby Z, following hemolytic fission of the Z—S bond, forms alternatively a secondary, tertiary or aromatically stabilized radical.

In that case, in the trithiocarbonate modifier, both moieties, R and Z, have a polymerization-initiating effect, Very particular preference is given, furthermore, to using a modifier of the general formula (VII)) wherein R and Z are alike or different, and with the proviso that R and Z, following hemolytic fission of the R—S or Z—S bond, respectively, each form a secondary, tertiary or aromatically stabilized radical, are a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero)aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

With regard to the formulations, as used for the general formula (VIb) and subsequently for the general formulae (VIc), (VId) and (VIe), "that R, following homolytic fission of the R—S bond, forms a secondary or tertiary radical", the definitions below apply. They likewise apply, analogously, to the corresponding formulation "that Z, following homolytic fission of the Z—S bond, forms a secondary or tertiary radical", where that formulation is used in the context of the specification in connection with Z.

The atom in the moiety R that produces the bond to S in the general formula (VIb) (and, respectively, in the subsequent general formulae (VIc), (VId) and (VIe)), leads then, on homolytic fission of the R—S bond, to a radical which is referred to as "tertiary" when this atom has attached to it (with the exception of the bond to the sulphur) at least
(i) three substituents via single bonds, or
(ii) one substituent via a single bond and a further substituent via a double bond, or
(iii) one substituent via a triple bond,
all of the aforementioned substituents necessarily being other than hydrogen.

The atom in the moiety R that produces the bond to S in the general formulae (VIb), (VIc), (VId) and (VIe) leads then, on homolytic fission of the R—S bond, to a radical identified as being "secondary", when attached to said atom there
(i) are two substituents via single bonds or
(ii) is one substituent via a double bond,
it being necessary for all of the aforementioned substituents to be other than hydrogen, and all further possible substituents being H.

Examples of moieties R or Z which on homolytic fission of the R—S (or Z—S) bond result in a radical referred to as "tertiary" are, for example, tert-butyl, cyclohexane-1-nitrile-1-yl and 2-methylpropanenitrile-2-yl.

Examples of moieties R or Z which on homolytic fission of the R—S (or Z—S) bond result in a radical referred to as "secondary" are, for example, sec-butyl, isopropyl and cycloalkyl, preferably cyclohexyl.

With regard to the proviso as used below for the formula (VId) to the effect "that Z, following homolytic fission of the Z—S bond, forms a primary radical", the following definition applies: the atom in the moiety Z that produces the bond to S in the general formula (VId) results, on homolytic fission of the Z—S bond, in a radical referred to as "primary" when this atom has attached to it, via a single bond, no substituent or not more than one substituent, which is not hydrogen. For Z=H, the above proviso is considered by definition to have been met.

Examples of moieties Z which result, on homolytic fission of the Z—S bond, in a radical referred to as "primary" are, therefore, for example, H, linear $C_1$-$C_{20}$ alkyl moieties, OH, SH, SR and $C_2$-$C_{20}$ alkyl moieties with branches beyond the C Atom that produces the bond to S.

Dithioesters:

A further preferred modifier which can be used is a modifier of the general formula (VIc)

(VIc)

Z possesses the definitions stated above for the general formula (VI),

R possesses the definitions stated above for the general formula (VI) for the variant b) with m=0, albeit with the restriction that R, following homolytic fission of the S—R bond, forms alternatively a secondary, tertiary or aromatically stabilized radical.

This particularly preferred modifier of the general formula (Vic) is a product of the modifier of the general formula (VI) where n and m are each =0, t is 1, X is $C(Z)_2$, Z possesses the definitions stated above for the general formula (VI), and R possesses the definitions stated above for the general formula (VI) for the variant b) with m=0, albeit with the restriction that R, following homolytic fission of the S—R bond, forms alternatively a secondary, tertiary or aromatically stabilized radical.

Particular preference is given to using a modifier of the general formula (VIc) wherein R with the proviso that R, following homolytic fission of the S—R bond, forms alternatively a secondary, tertiary or aromatically stabilized radical, is a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or unsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero)aryl moiety, more particularly phenyl, pyridinyl or anthracenyl, a (hetero)arylalkyl moiety, very preferably a $C_7$-$C_{25}$-(hetero)arylalkyl moiety, more particularly benzyl, phenylethyl or 1-methyl-1-phenyleth-2-yl, or thiocarboxyl, carbonyl, carboxyl, oxo, thioxo, epoxy, and also salts of the aforementioned compounds.

Asymmetrical Trithiocarbonates:

In another preferred embodiment, at least one modifier of the general formula (VId) is used,

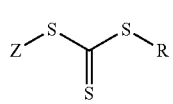

(VId)

in which
Z possesses the definitions stated above for the general formula (VI) albeit with the restriction that Z, following homolytic fission of the S—Z bond, forms a primary radical, and R may possess the same definitions as Z in the general formula (VI), albeit with the restriction that R, following homolytic fission of the SR bond, forms alternatively a secondary, tertiary or aromatically stabilized radical, and with the additional proviso that Z and R adopt different definitions.

This preferred modifier of the general formula (VId) is a product of the modifier of the general formula (VI) where
n and m are each =0,
t is 1,
X is sulphur,
Z possesses the definitions stated above for the general formula (VI), albeit with the restriction that Z, following homolytic fission of the S—Z bond, forms a primary radical, and
R may possess the same definitions as Z in the general formula (VI), albeit with the restriction that R, following homolytic fission of the S—R bond, forms alternatively a secondary, tertiary or aromatically stabilized radical.

These particularly preferred modifiers of the general formula (VId) are therefore asymmetrical trithiocarbonates.

Particular preference is given to a modifier of the above-mentioned general formula (VId) in which
Z with the proviso that Z, following homolytic fission of the S—Z bond, forms a primary radical, is H, a linear or branched, saturated or mono- or polyunsaturated, optionally singularly or multiply substituted alkyl moiety, very preferably a corresponding $C_1$-$C_{16}$ alkyl moiety, more particularly methyl, ethyl, n-prop-1-yl, but-2-en-1-yl, n-pent-1-yl, n-hex-1-yl or n-dodecan-1-yl, aralkyl, very preferably $C_7$-$C_{25}$-aralkyl, more particularly benzyl, amino, amido, carbamoyl, hydroxyimino, alkoxy, aryloxy, F, Cl, Br, I, hydroxyl, alkylthio, arylthio, carbonyl, carboxyl, oxo, thioxo, cyanates, thiocyanates, isocyanates, thioisocyanates, isocyanides or salts of the stated compounds, and R with the proviso that R, following homolytic fission of the S—R bond, forms alternatively a secondary, tertiary or aromatically stabilized radical, is
a linear, branched or cyclic, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-inethylpropanenitrile-2-yl, 2-methylpropionic acid-2-yl or 1H,1H,2-keto-3-oxo-4H,4H,5H,5H-perfluoroundecanyl, or a saturated or unsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-aryl moiety, more particularly phenyl, pyridinyl or anthracenyl, an aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

Dithioesters:

In a further preferred embodiment, at least one modifier of the general formula (VIe) is used,

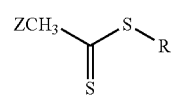

(VIe)

in which
Z may possess any of the definitions stated for the general formula (VI), and
R may possess the same definitions as Z in the general formula (VI), albeit with the restriction that R, following homolytic fission of the S—R bond, forms alternatively a secondary, tertiary or aromatically stabilized radical.

This preferred modifier of the general formula (VIe) is a product of the modifier of the general formula (VI) where
n and m are each =0,
t is 1,
X is $CH_2$,
Z possesses the definitions stated above for the general formula (VI), and
R may possess the same definitions as Z in the general formula (VI), albeit with the restriction that R, following homolytic fission of the S—R bond, forms alternatively a secondary, tertiary or aromatically stabilized radical.

Particular preference is given to a modifier of the above-mentioned general formula (Vie) in which
R with the proviso that R, following homolytic fission of the S—R bond, forms alternatively a secondary, tertiary or aromatically stabilized radical, is
a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or unsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero)aryl moiety, more particularly phenyl, pyridinyl or anthracenyl, a (hetero)arylalkyl moiety, very preferably a $C_7$-$C_{25}$-(hetero)arylalkyl moiety, more particularly benzyl, phenylethyl or 1-methyl-1-phenyleth-2-yl, or thiocarboxyl, carbonyl, carboxyl, oxo, thioxo, epoxy, and also salts of the aforementioned compounds.

All of the aforementioned modifiers can be synthesized by methods familiar to the skilled person from the prior art. Synthesis procedures and further references to preparation instructions may be found, for example, in Polymer 49 (2008) 1079-1131 and also in all literature references and patents that have already been stated as prior art in the present specification. A number of the modifiers are also already available commercially.

Particularly suitable as modifiers for the process of the invention are dodecylpropanoic acid trithiocarbonate (DoPAT), dibenzoyl trithiocarbonate (DiBenT), cumyl phenyl dithioacetate (CPDA), cumyl dithiobenzoate, phenyl ethyl dithiobenzoate, cyanoisopropyl dithiobenzoate, 2-cyanoethyl dithiobenzoate, 2-cyanoprop-2-yl dithiophenylacetate, 2-cyanoprop-2-yl dithiobenzoate, S-thiobenzoyl-1H,1H,2-keto-3-oxa-4H,4H,5H,5H-perfluoroundecanethiol and S-thiobenzoyl-1-phenyl-2-keto-3-oxa-4H,4H,5H,5H-perfluoroundecanethiol.

It is usual to use 5 to 2000 mol % of the modifier per mole of the initiator. Preference is given to using 20 to 1000 mol % of the modifier per mole of the initiator.

Initiators:

The process of the invention is a free-radical polymerization. The way in which it is initiated is not critical, and hence contemplation may be given to initiation by peroxidic initiators, azo initiators, redox systems or photochemical initiation. Among these initiators, the azo initiators are preferred.

Azo initiators which can be used are, for example, the following compounds: 2,2'-azobis(isobutyronitrile), 2,2'-azobis(2-cyano-2-butane), dimethyl 2,2'-azobisdimethylisobutyrate, 4,4'-azobis(4-cyanopentanoic acid), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]propionamide, 2,2'-azobis(N,N-dimethyleneisobutyramidine) dihydrochloride, 2,2'-azobis(2-amidinopropane) dihydrochloride, 2,2'-azobis(N,N'-dimethyleneisobutyramine), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), 1,1'-azobis(cyclohexane-1-carbonitrile), 2,2'-azobis[N-(2-propenyl)-2-methylpropionamide, 1-[(1-cyano-1-methylethyl)azo]formamide, 2,2'-azobis(N-butyl-2-methylpropionamide), 2,2'-azobis(N-cyclohexyl-2-methylpropionamide) and 2,2'-azobis(2,4,4-trimethylpentane).

The azo initiators are used typically in an amount of $10^{-4}$ to $10^{-1}$ mol/l, preferably in an amount of $10^{-3}$ to $10^{-2}$ mol/l. By harmonizing the proportion of the amount of initiator used to the amount of the modifier used, success is achieved in specifically influencing not only the reaction kinetics but also the molecular structure (molecular weight, polydispersity).

Peroxidic initiators that can be used include, for example, the following peroxo compounds, containing an —O—O— unit: hydrogen peroxide, peroxodisulphates, peroxodiphosphates, hydroperoxides, peracids, peracid esters, peracid anhydrides and peroxides having two organic moieties. As salts of peroxodisulphuric acid and of peroxodiphosphoric acid it is possible to use sodium, potassium and ammonium salts. Examples of suitable hydroperoxides include t-butyl hydroperoxide, cumene hydroperoxide, pinane hydroperoxide and p-menthane hydroperoxide. Suitable peroxides having two organic moieties are dibenzoyl peroxide, 2,4-dichlorobenzoyl peroxide, 2,5-dimethylhexane-2,5-di-t-butyl peroxide, bis(t-butylperoxyisopropyl)benzene, t-butyl cumyl peroxide, di-t-butyl peroxide, dicumyl peroxide, t-butyl perbenzoate, t-butyl peracetate, 2,5-di methylhexane 2,5-diperbenzoate, t-butyl per-3,5,5-trimethylhexanoate. Preference is given to using p-menthane hydroperoxide, cumene hydroperoxide or pinane hydroperoxide.

In an alternative embodiment, azo initiators or peroxidic initiators with a prolonged decomposition time are used. In this case it has been found appropriate to select the azo initiator or peroxidic initiator such that the half-life of the respective initiator in the selected solvent is 10 hours or more than 10 hours at a temperature of 70° C. to 200° C., preferably 80° C. to 175° C., more preferably 85° C. to 160° C. and more particularly 90° C. to 150° C. Preference is given here to azo initiators which possess a half-life of 10 hours or more than 10 hours in the selected solvent at a temperature of 70° C. to 200° C., preferably 80° C. to 175° C., more preferably 85° C. to 160° C. and very preferably 90° C. to 150° C. It is particularly preferred to use azo initiators of the following structural formulae (Ini-1) (Ini-6):

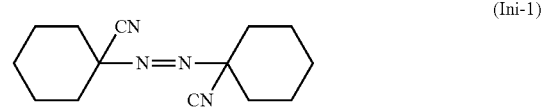

(Ini-1)

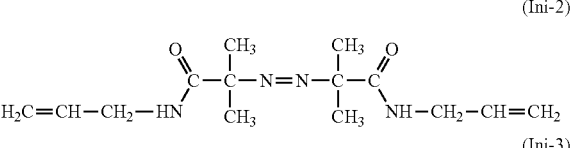

(Ini-2)

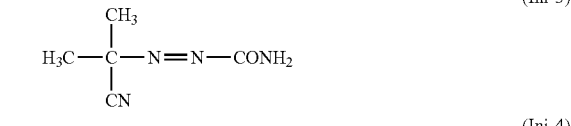

(Ini-3)

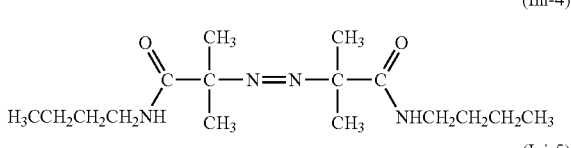

(Ini-4)

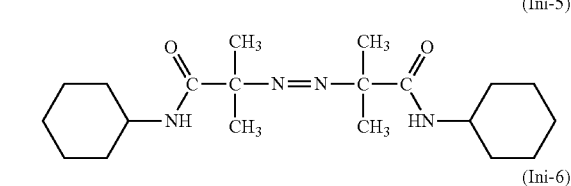

(Ini-5)

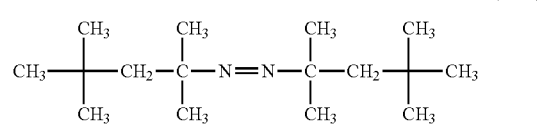

(Ini-6)

Especially preferred is the use of the initiators of the formula (Ini-2) and (Ini-3).

The above azo initiators of the structural formulae (Ini-1)-(Ini-6) are available commercially, for example from Wako Pure Chemical Industries, Ltd.

The concept of the half-life is familiar to the skilled person in connection with initiators. Merely as an example: a half-life of 10 hours in a solvent at a particular temperature means specifically that, under these conditions, half of the initiator has undergone decomposition after 10 hours.

When the above preferred initiators with a relatively high decomposition temperature are used, especially the stated azo initiators, it is possible to synthesize nitrile rubbers having comparatively higher average molecular weights Mw (weight average of the molecular weight) and Mn (number average of the molecular weight) which are also notable at the same time for a high linearity. This is manifested by correspondingly low values for the Mooney relaxation, measured by ISO 289 parts 1 & 2 or alternatively in accordance with ASTM D1646.

Redox systems which can be used are the following systems composed of an oxidizing agent and a reducing agent. The choice of suitable amounts of oxidizing agent and reducing agent is sufficiently familiar to the skilled person.

In the case where redox systems are used it is common to make additional use of salts of transition metal compounds such as iron, cobalt or nickel in combination with suitable complexing agents such as sodium ethylenediaminetetraacetate, sodium nitrilotriacetate and also trisodium phosphate or tetrapotassium diphosphate.

Oxidizing agents which can be used in this context include, for example, all peroxo compounds identified above for the peroxidic initiators.

Reducing agents which can be used in the process of the invention include, for example, the following: sodium formaldehydesulphoxylate, sodium benzaldehydesulphoxylate, reducing sugars, ascorbic acid, sulphenates, sulphinates, sulphoxylates, dithionite, sulphite, metabisulphite, disulphite, sugars, urea, thiourea, xanthogenates, thioxanthogenates, hydrazinium salts, amines and amine derivatives such as aniline, dimethylaniline, monoethanolamine, diethanolamine or triethanolamine. Preference is given to using sodium formaldehydesulphoxylate.

The free-radical polymerization may also be initiated photochemically as described below: for this purpose a photoinitiator is added to the reaction mixture, the photoinitiator being excited by exposure to light of appropriate wavelength, and initiating a free-radical polymerization. Here it should be noted that for the optimum initiation of the free-radical polymerization, the irradiation time is dependent on the power of the radiation source, on the distance between the source and the reaction vessel, and on the area of irradiation. To the skilled person, however, it is readily possible, by means of various test series, to determine the optimum irradiation time. The choice of the suitable amount of initiator is also possible without problems to a skilled person, and is used to influence the time/conversion behaviour of the polymerization.

Examples of photochemical initiators which can be used include the following: benzophenone, 2-methylbenzophenone, 3,4-dimethylbenzophenone, 3-methylbenzophenone, 4,4'-bis(diethylamino)benzophenone, 4,4'-dihydroxybenzophenone, 4,4'-bis[2-(1-propenyl)phenoxy]benzophenone, 4-(diethylamino)benzophenone, 4-(dimethylamino)benzophenone, 4-benzoylbiphenyl, 4-hydroxybenzophenone, methylbenzophenone, benzophenone-3,3',4,4'-tetracarboxylic dianhydride, 4,4-bis(dimethylamino)benzophenone, acetophenone, 1-hydroxycyclohexyl phenyl ketone, 2,2-diethoxyacetophenone, 2,2-dimethoxy-2-phenylacetophenone, 2-benzyl-2-(dimethylamino)-4'-morpholinobutyrophenone, 2-hydroxy-2-methylpropiophenone, 2-hydroxy-4'-(2-hydroxyethoxy)-2-methylpropiophenone, 3'-hydroxyacetophenone, 4'-ethoxyacetophenone, 4'-hydroxyacetophenone, 4'-phenoxyacetophenone, 4'-tert-butyl-2',6'-dimethylacetophenone, 2-methyl-4'-(methylthio)-2-morpholinopropiophenone, diphenyl(2,4,6-trimethylbenzoyl)phosphine oxide, phenyl bis(2,4,6-trimethylbenzoyl)phosphine oxide, methyl benzoylformate, benzoin, 4,4-dimethoxybenzoin, benzoin methyl ether, benzoin ethyl ether, benzoin isopropyl ether, benzoin isobutyl ether, 4,4'-dimethylbenzyl, hexachlorocyclopentadienes or combinations thereof.

Solvents:

The process of the invention is carried out in an organic solvent. Large amounts of water, as in the case of emulsion polymerization, are therefore not present in the reaction systems. Smaller amounts of water, in the order of magnitude of up to 5% by weight, preferably up to 1% by weight, based on the amount of organic solvent, may well be present in the reaction system. What is critical is that the amounts of water present should be kept so low that there is no precipitation of the NBR polymer as it forms. Let it be clearly stated at this point that the process of the invention is not an emulsion polymerization.

Examples of suitable organic solvents include dimethylacetamide, monochlorobenzene, toluene, ethyl acetate, 1,4-dioxane, t-butanol, isobutyronitrile, 3-propanone, dimethylcarbonate, 4-methylbutan-2-one and methyl ethyl ketone. Preference is given to polar solvents which have a Hildebrand solubility parameter $\delta(\delta=((\Delta H_V-RT)/V_m)^{1/2}$ $[(MPa)^{1/2}])$ ($V_m$=molar volume; $\Delta H_V$=enthalpy of vaporization; R=ideal gas constant)) in a range between 15.5 and 26 $(MPa)^{1/2}$.

Critical to the suitability of a solvent is that the nitrile rubber prepared should remain completely in solution at the reaction temperature, which is usually in the lower stated range. It is not possible to use those solvents which intervene in the reaction as transfer reagents, such as carbon tetrachloride, thiols and other solvents known to the skilled person to be solvents of that kind.

It is likewise possible to use a mixture of two or more organic solvents.

It is also possible to use solvents which satisfy the above requirements and have a boiling point which is lower than that of acrylonitrile, such as, for example, methyl tert-butyl ether (MTBE).

Temperature:

The process of the invention is typically carried out at a temperature in range from 60° C. to 150° C., preferably in a range from 70° C. to 130° C., more preferably in a range from 80° C. to 120° C., and more particularly in a range from 90° C. to 110° C. If the temperature selected is even lower, the polymerization is slowed down correspondingly. At temperatures which are significantly higher, it is possible that the initiator used may decompose too rapidly or that the RAFT agent is decomposed. Particularly when using peroxidic initiators, it is possible that, in certain circumstances, the modifier may be oxidized.

Reaction:

In the case of initiation by peroxo compounds or by azo initiators, the implementation of the process of the invention is typically such that the α,β-unsaturated nitrile and the other copolymerizable monomers employed optionally, the solvent, the initiator and also the modifier/modifiers are charged to a reaction vessel and then the conjugated diene or dienes is or are metered in. The polymerization is subsequently started by an increase in temperature.

In the case of initiation by means of a redox system, the oxidizing agent is typically metered into the reaction vessel together with one of the monomers. The polymerization is subsequently started by addition of the reducing agent.

In order to obtain specific proportions of the respective monomers in the co/terpolymer, it is sensible, and entirely familiar to the skilled person, to make appropriate modifications concerning metered addition (for example, by subsequently metering in more of the respective monomer, of initiator quantities, regulator quantities or solvent). These subsequent metered additions may take place either continuously or else discontinuously in individual portions. The subsequent metered addition of the monomers or else of initiator as well may take place either continuously or else discontinuously in individual portions.

In order to set a suitable molecular weight, and also for the purpose of attaining the desired conversion, it has been found appropriate, in one embodiment of the process of the invention, to carry out subsequent metered addition on one or more occasions in the course of the polymerization reaction both of more initiator and of more solvents.

Nitrile Rubbers:

Provided by the new polymerization process are nitrile rubbers, possibly hydrogenated, comprising
(i) repeating units derived from at least one conjugated diene, at least one α,β-unsaturated nitrile and optionally one or more further copolymerizable monomers, and
(ii) one or more structural elements of the general formulae (I), (II), (III), (IV) or (V)

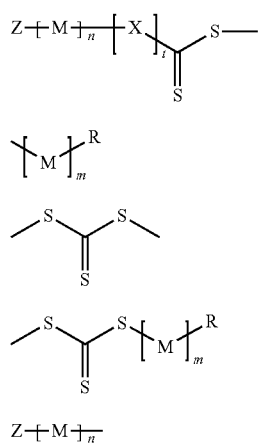

in which
Z is H, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulphamoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides, M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides, n and m are alike or different and are each in the range from 0 to 10 000,
t is 0 or 1, if n=0, and is 1, if n≠0,
X is $C(Z_2)$, $N(Z)$, $P(Z)$, $P(=O)(Z)$, O, S, $S(=O)$ or $S(=O)_2$, it being possible for Z in these moieties to possess the same definitions as set out above, and
R (a), if m≠0, may possess the same definitions as the moiety Z, and
(b), if m=0, is H, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, carbamoyl, alkoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides.

The definitions stated in the aforementioned moieties Z and R may in each case be singularly or multiply substituted. In this respect, the comments made for Z and R with regard to the general formula (VI) apply identically. Furthermore, the comments made with regard to the general formula (VI) in respect of the inclusion of certain definitions for Z and R (in the form of salts of the stated moieties, of organometallic salts, as ligands for organometallic complex compounds, and the attachment via linkers to solid phases or support substances) apply identical for Z and R in the general structural elements (I)-(V). Furthermore, the comments made in respect of the general formula (VI) concerning the optional substitution of the definitions lying behind M apply identically for the general structural element (I), (II), (IV) and (V).

Preference is given to unhydrogenated or hydrogenated nitrile rubbers which comprise structural elements (ii) of the general formulae (VIb-1) and (VIb-2),

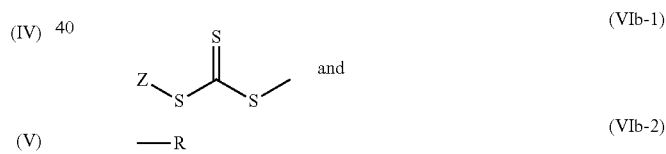

in which
Z possesses the definitions given above for the general formula (I) and
R possesses the definitions given above for the general formula (I), albeit with the restriction that R, following homolytic fission of the bond to the adjacent bonded atom in the nitrile rubber, forms alternatively a secondary, tertiary or aromatically stabilized radical.

It has proved to be suitable in particular for Z and R here to be different.

These structural elements are present as end groups in the nitrile rubbers, and are produced when the preferred modifiers of the general formula (VIb) are used.

Particularly preferred nitrile rubbers are those comprising, as general structural elements (ii), the end group (VIb-1) and (VIb-2), in which R, with the proviso that R, following homolytic fission of the bond to the next bonded atom, forms alternatively a secondary, tertiary or aromatically stabilized radical, is
a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H, 1H,2-keto-3-oxo-4H,4H,5H,5H-perfluoroundecanyl, or a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero)aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

Particular preference is given to unhydrogenated or hydrogenated nitrile rubbers in which general structural elements (ii) include

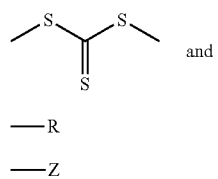

(III)

and

—R (II')

—Z (I')

where

Z may have the same definitions as in the general formula (I) and

R may have the same definitions as in the general formula (II) for m=0, and

R and Z are alike or different, albeit in each case with the proviso that R and Z following homolytic fission of their bond to the respectively adjacent atom in the optionally hydrogenated nitrile rubber each form a secondary, tertiary or aromatically stabilized radical.

Unhydrogenated or hydrogenated nitrite rubbers having the aforementioned general structural elements (II) are obtained when use is made as modifier of a compound of the general structural formula (VIb) in which Z possesses the same definitions as the general formula (VI) and R possesses the same definitions as in the general formula (VI) for variant b) with m=0, and R and Z are alike or different, albeit in each case with the proviso that R and Z, following homolytic fission of their bond to the closest sulphur in the modifier, each form a secondary, tertiary or aromatically stabilized radical.

Particular preference is given to unhydrogenated or hydrogenated nitrile rubbers which comprise as general structural elements (ii) the elements (III) and (II') and/or (I') in which R and Z are alike or different and, with the proviso that R and Z, following homolytic fission to the respectively adjacent bonded atom form respectively a secondary, tertiary or aromatically stabilized radical, is a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,2-keto-3-oxo-4H,4H,5H,5H-perfluoroundecanyl, or a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero)aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

Preference is given to unhydrogenated or hydrogenated nitrile rubbers which comprise as general structural elements (ii)

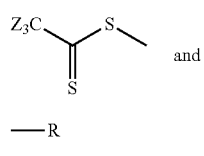

(VIc-1)

and

—R (VIc-2)

in which

Z possesses the definitions stated above for the general formula (I),

R possesses the definitions stated above for the general formula (II), albeit with the restriction that R, following homolytic fission of the bond to the adjacent atom in the unhydrogenated or hydrogenated nitrile rubber, forms a secondary, tertiary or aromatically stabilized radical.

These structural elements are present as end groups in the optionally hydrogenated nitrile rubbers and are formed when the preferred modifiers of the general formula (VIc) are employed.

Particular preference is given to unhydrogenated or hydrogenated nitrile rubbers which comprise as general structural elements (ii) the structural elements (VIc-1) and (VIc-2) in which R with the proviso that R, following homolytic fission of the bond to the next atom in the unhydrogenated or hydrogenated nitrile rubber, forms a secondary, tertiary or aromatically stabilized radical, is a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H, 1H,2-keto-3-oxo-4H,4H,5H,5H-perfluoroundecanyl, or a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero)aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

The conjugated diene in the nitrile rubber may be of any kind. It is preferred to use ($C_4$-$C_6$) conjugated dienes. Particular preference is given to 1,2-butadiene, 1,3-butadiene, isoprene, 2,3-dimethylbutadiene, piperylene or mixtures thereof. More particular preference is given to 1,3-butadiene and isoprene or mixtures thereof. 1,3-Butadiene is especially preferred.

As α,β-unsaturated nitrile it is possible to use any known α,β-unsaturated nitrile, preference being given to ($C_3$-$C_5$) α,β-unsaturated nitriles such as acrylonitrile, methacrylonitrile, ethacrylonitrile or mixtures thereof. Acrylonitrile is particularly preferred.

One particularly preferred nitrile rubber is a copolymer of acrylonitrile and 1,3-butadiene.

As further copolymerizable termonomers it is possible to make use, for example, of aromatic vinylmonomers, preferably styrene, a-methylstyrene and vinylpyridine, fluorine-containing vinylmonomers, preferably fluoroethyl vinyl ether, fluoropropyl vinyl ether, o-fluoromethylstyrene, vinyl pentafluorobenzoate, difluoroethylene and tetrafluoroethylene, or else copolymerizable anti-ageing monomers, preferably N-(4-anilinophenyeacrylamide, N-(4-anilinophenyl)methacrylamide, N-(4-anilinophenyl)cinnamides, N-(4-anilinophenyl)crotonamide, N-phenyl-4-(3-vinylbenzyloxy) aniline and N-phenyl-4-(4-vinylbenzyloxy)aniline, and also non-conjugated dienes, such as 4-cyanocyclohexene and 4-vinylcyclohexene, or else alkynes, such as 1- or 2-butyne.

Alternatively, as further copolymerizable termonomers, it is possible to use copolymerizable termonomers containing carboxyl groups, examples being α,β-unsaturated monocarboxylic acids, their esters, α,β-unsaturated dicarboxylic acids, their monoesters or diesters, or their corresponding anhydrides or amides.

As α,β-unsaturated monocarboxylic acids it is possible with preference to use acrylic acid and methacrylic acid.

It is also possible to employ esters of the α,β-unsaturated monocarboxylic acids, preferably their alkyl esters and alkoxyalkyl esters. Preference is given to the alkyl esters, especially $C_1$-$C_{18}$ alkyl esters, of the α, β-unsaturated monocarboxylic acids. Particular preference is given to alkyl esters, especially $C_1$-$C_{18}$ alkyl esters, of acrylic acid or of methacrylic acid, more particularly methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Also preferred are alkoxyalkyl esters of the α,β-unsaturated monocarboxylic acids, more preferably alkoxyalkyl esters of acrylic acid or of methacrylic acid, more particular $C_2$-$C_{12}$ alkoxyalkyl esters of acrylic acid or of methacrylic acid, very preferably methoxymethyl acrylate, methoxyethyl(meth)acrylate, ethoxyethyl(meth)acrylate and methoxymethyl(meth)acrylate. Use may also be made of mixtures of alkyl esters, such as those mentioned above, for example, with alkoxyalkyl esters, in the form of those mentioned above, for example. Use may also be made of cyanoalkyl acrylates and cyanoalkyl methacrylates in which the C atom number of the cyanoalkyl group is 2-12, preferably α-cyanoethyl acrylate, β-cyanoethyl acrylate and cyanobutyl methacrylate. Use may also be made of hydroxyalkyl acrylates and hydroxyalkyl methacrylate in which the C atom number of the hydroxyalkyl groups is 1-12, preferably 2-hydroxyethyl acrylate, 2-hydroxyethyl methacrylate and 3-hydroxypropyl acrylate; use may also be made of fluorine-substituted benzyl-group-containing acrylates or methacrylates, preferably fluorobenzyl acrylates, and fluorobenzyl methacrylate. Use may also be made of acrylates and methacrylates containing fluoroalkyl groups, preferably trifluoroethyl acrylate and tetrafluoropropyl methacrylate. Use may also be made of α,β-unsaturated carboxylic esters containing amino groups, such as dimethylaminomethyl acrylate and diethylaminoethyl acrylate.

As other copolymerizable monomers it is possible, furthermore, to use α,β-unsaturated dicarboxylic acids, preferably maleic acid, fumaric acid, crotonic acid, itaconic acid, citraconic acid and mesaconic acid.

Use may be made, furthermore, of α,β-unsaturated dicarboxylic anhydrides, preferably maleic anhydride, itaconic anhydride, citraconic anhydride and mesaconic anhydride.

It is possible, furthermore, to use monoesters or diesters of α,β-unsaturated dicarboxylic acids.

These α,β-unsaturated dicarboxylic monoesters or diesters may be, for example, alkyl esters, preferably $C_1$-$C_{10}$ alkyl, more particularly ethyl, n-propyl, isopropyl, n-butyl, tert-butyl, n-pentyl or n-hexyl esters, alkoxyalkyl esters, preferably $C_2$-$C_{12}$ alkoxyalkyl, more preferably $C_3$-$C_8$-alkoxyalkyl, hydroxyalkyl, preferably $C_1$-$C_{12}$ hydroxyalkyl, more preferably $C_2$-$C_8$ hydroxyalkyl, cycloalkyl esters, preferably $C_5$-$C_{12}$ cycloalkyl, more preferably $C_6$-$C_{12}$ cycloalkyl, alkylcycloalkyl esters, preferably $C_6$-$C_{12}$ alkylcycloalkyl, more preferably $C_7$-$C_{10}$ alkylcycloalkyl, aryl esters, preferably $C_6$-$C_{14}$ aryl esters, these esters being monoesters or diesters, and it also being possible, in the case of the diesters, for the esters to be mixed esters.

Particularly preferred alkyl esters of α,β-unsaturated monocarboxylic acids are methyl(meth)acrylate, ethyl(meth) acrylate, propyl(meth)acrylate, n-butyl(meth)acrylate, t-butyl(meth)acrylate, hexy(meth)acrylate, 2-ethylhexyl(meth) acrylate, octyl(meth)acrylate, 2-propyl-heptyl acrylate and lauryl(meth)acrylate. More particularly, n-butyl acrylate is used.

Particularly preferred alkoxyalkyl esters of the α,β-unsaturated monocarboxylic acids are methoxyethyl(meth)acrylate, ethoxyethyl(meth)acrylate and methoxymethyl(meth)acrylate. More particularly, methoxyethyl acrylate is used.

Particularly preferred hydroxyalkyl esters of the α,β-unsaturated monocarboxylic acids are hydroxyethyl(meth) acrylate, hydroxypropyl(meth)acrylate and hydroxybutyl (meth)acrylate.

Other esters of the α,β-unsaturated monocarboxylic acids that are used are additionally, for example, polyethylene glycol(meth)acrylate, polypropylene glycol(meth)acrylate, glycidyl(meth)acrylate, epoxy(meth)acrylate, N-(2-hydroxyethyl)acrylamides, N-(2-hydroxy-methyl)acrylamides and urethane(meth)acrylate.

Examples of α,β-unsaturated dicarboxylic monoesters encompass maleic acid monoalkyl esters, preferably monomethyl maleate, monoethyl maleate, monopropyl maleate and mono-n-butyl maleate;

maleic acid monocycloalkyl esters, preferably monocyclopentyl maleate, monocyclohexyl maleate and monocycloheptyl maleate;

maleic acid monoalkyl cycloalkyl esters, preferably monomethyl cyclopentyl maleate and monoethyl cyclohexyl maleate;

maleic acid monoaryl esters, preferably monophenyl maleate;

maleic acid monobenzyl esters, preferably monobenzyl maleate;

fumaric acid monoalkyl esters, preferably monomethyl fumarate, monoethyl fumarate, monopropyl fumarate and mono-n-butyl fumarate;

fumaric acid monocycloalkyl esters, preferably monocyclopentyl fumarate, monocyclohexyl fumarate and monocycloheptyl fumarate;

fumaric acid monoalkyl cycloalkyl esters, preferably monomethyl cyclopentyl fumarate and monoethyl cyclohexyl fumarate;

fumaric acid monoaryl esters, preferably monophenyl fumarate;

fumaric acid monobenzyl esters, preferably monobenzyl fumarate;

citraconic acid monoalkyl esters, preferably monomethyl citraconate, monoethyl citraconate, monopropyl citraconate and mono-n-butyl citraconate;

citraconic acid monocycloalkyl esters, preferably monocyclopentyl citraconate, monocyclohexyl citraconate and monocycloheptyl citraconate;

citraconic acid monoalkyl cycloalkyl esters, preferably monomethyl cyclopentyl citraconate and monoethyl cyclohexyl citraconate;

citraconic acid monoaryl esters, preferably monophenyl citraconate;

citraconic acid monobenzyl esters, preferably monobenzyl citraconate;

itaconic acid monoalkyl esters, preferably monomethyl itaconate, monoethyl itaconate, monopropyl itaconate and mono-n-butyl itaconate;

itaconic acid monocycloalkyl esters, preferably monocyclopentyl itaconate, monocyclohexyl itaconate and monocycloheptyl itaconate;

itaconic acid monoalkyl cycloalkyl esters, preferably monomethyl cyclopentyl itaconate and monoethyl cyclohexyl itaconate;

itaconic acid monoaryl esters, preferably monophenyl itaconate;

itaconic acid monobenzyl esters, preferably monobenzyl itaconate.

Mesaconic acid monoalkyl esters, preferably mesaconic acid monoethyl esters;

As α,β-unsaturated dicarboxylic diesters it is possible to use the analogous diesters based on the abovementioned monoester groups, and the ester groups may also be chemically different groups.

It is further possible, as further copolymerizable monomers, to use free-radically polymerizable compounds which contain per molecule two or more olefinic double bonds. Examples of such di- or polyunsaturated compounds are di- or polyunsaturated acrylates, methacrylates or itaconates of polyols, such as, for example, 1,6-hexanediol diacrylate (HDODA), 1,6-hexanediol dimethacrylate, ethylene glycol diacrylate, ethylene glycol dimethacrylate (EGDMA), diethylene glycol dimethacrylate, triethylene glycol diacrylate, butane-1,4-diol diacrylate, propane-1,2-diol diacrylate, butane-1,3-diol dimethacrylate, neopentylglycol diacrylate, trimethylolpropane diacrylate, trimethylolpropane dimethacrylate, trimethylolethane diacrylate, trimethylolethane dimethacrylate, trimethylolpropane triacrylate, trimethylolpropane trimethacrylate (TMPTMA), glyceryl diacrylate and triacrylate, pentaerythritol di-, tri- and tetraacrylate or -methacrylate, dipentaerythritol tetra-, penta- and hexaacrylate or -methacrylate or -itaconate, sorbitol tetraacrylate, sorbitol hexamethacrylate, diacrylates or dimethacrylates or 1,4-cyclohexanediol, 1,4-dimethylolcyclohexane, 2,2-bis(4-hydroxyphenyl)propane, of polyethylene glycols or of oligoesters or oligourethanes having terminal hydroxyl groups. As polyunsaturated monomers it is also possible to use acrylamides, such as, for example, methylenebisacrylatnide, hexamethylene-1,6-bisacrylamide, ethylenetriaminetrismethacrylamide, bis(methacrylamidopropoxy)ethane or 2-acrylamidoethyl acrylate. Examples of polyunsaturated vinyl compounds and allyl compounds are divinylbenzene, ethylene glycol divinyl ether, diallyl phthalate, allyl methacrylate, diallyl maleate, triallyl isocyanurate or triallyl phosphate.

When termonomers of this kind are employed it is possible with advantage successfully to take the polymerization to high conversions and at the same time to prepare nitrile rubbers which have a comparatively higher average molecular weight Mw (weight average) and/or Mn (number average), and yet are gel-free.

The proportions of conjugated diene and α,β-unsaturated nitrile in the resultant NBR polymers may vary within wide ranges. The proportion of or the sum of the conjugated dienes is typically in the range from 40 to 90% preferably in the range from 50 to 85%, by weight, based on the overall polymer. The proportion of or the sum of the α,β-unsaturated nitriles is typically 10 to 60%, preferably 15 to 50%, by weight, based on the overall polymer. The proportions of the monomers add up in each case to 100% by weight. The additional monomers, depending on the nature of the termonomer or termonomers, may be present in amounts of 0% to 40% by weight, based on the overall polymer. In this case, corresponding proportions of the conjugated diene or dienes and/or of the α,β-unsaturated nitrile or nitriles are replaced by the proportions of the additional monomers, with the proportions of all the monomers adding up in each case to 100% by weight.

Where the termonomers are monomers of the kind that form tertiary radicals (e.g. methacrylic acid), it has been found appropriate to use them in amounts of 0% to 10% by weight.

It should be noted that the limitation given above for the additional monomers, to a maximum of 40%, applies only in the scenario where the total amount of monomers is metered in to the polymerization batch at the beginning or during the reaction (in other words in order to produce random terpolymer systems). It is of course possible, owing to the fact that a nitrile rubber which is optionally hydrogenated and is prepared in accordance with the invention has fragments of the modifier or modifiers used in its main polymer chain and/or its end groups, for it to be employed as a macro-modifier and to be employed in any desired amount, by reaction with suitable monomers for the purpose, for example, of generating block systems.

The glass transition temperatures of the optionally hydrogenated nitrile rubbers of the invention are situated in the range from −70° C. to +20° C., preferably in the −60° C. to 10° range.

Owing to the living nature of the polymerization via the process of the invention it is possible to obtain nitrile rubbers having a narrow molecular weight distribution. Nitrile rubbers can be prepared that have a polydispersity index in the range from 1.0 to 2.9, preferably in the range from 1.1 to 2.8, more preferably in the range from 1.15 to 2.7 and more particularly in the range from 1.2 to 2.6.

Owing to the living nature of the polymerization via the process of the invention it is even possible to obtain nitrile rubbers having an extremely narrow molecular weight distribution. Nitrile rubbers can be prepared that have a polydispersity index in the range from 1.1 to 2.5, preferably in a range from 1.3 to 2.4, more preferably in a range from 1.4 to 2.2, more particularly in a range from 1.5 to 2.0, very preferably in a range from 1.5 to less than 2.

Through control of the concentration of modifier, the process of the invention permits very precise adjustment of the desired molecular weight and additionally, through the use of the modifiers, also allows the construction of specific polymer architectures (e.g. preparation of blocks, grafts on polymer backbones, surface attachment, the use of termonomers having more than one C=C double bond, and also other polymer modifications known to the skilled person) and also of targeted molecular weight distributions, from extremely narrow through to broad distributions, from monomodal via bimodal and through to multimodal distributions. The nitrile rubbers synthesized specifically by way of these methods may possess a polydispersity index PDI=Mw/Mn, where Mw represents the weight average and Mn the number averable of the molecular weight, in the range from 1.1 to 8.0, preferably in the range from 1.15 to 7.0, more preferably in the range from 1.2 to 6.0 and more particularly in the range from 1.3 to 5.0.

Hydrogenation:

The present invention further provides hydrogenated nitrile rubbers through following the first polymerization step a) directly with the hydrogenation b), in which case there is no need for prior isolation of the nitrile rubber as in the case of the NBR emulsion polymerization employed to date in the prior art. The hydrogenation may be carried out immediately following the polymerization, and even, if desired, in the same reactor. This leads to a substantial simplification and hence to economic advantages in the preparation of HNBR.

The hydrogenation may be carried out using homogeneous or heterogeneous hydrogenation catalysts. The catalysts employed are based typically on rhodium, ruthenium or titanium, although use may also be made of platinum, iridium, palladium, rhenium, ruthenium, osmium, cobalt or copper, either as the metal or else, preferably, in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for hydrogenation in homogeneous phase are described below and are also known from DE-A-25 39 132 and from EP-A-0 471 250.

The selective hydrogenation may be achieved, for example, in the presence of a rhodium- or ruthenium-containing catalyst. Use may be made, for example, of a catalyst of the general formula

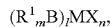

$(R^1_m B)_l MX_n$, in which M is ruthenium or rhodium, $R^1$ is a like or different at each occurrence and is a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulphur or a sulphoxide group S=O, X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis(triphenylphosphine)rhodium hydride of the formula $(C_6H_5)_3P)_4RhH$ and the corresponding compounds in which some or all of the triphenylphosphine has been replaced by tricyclohexylphosphine. The catalyst can be used in small amounts. An amount in the range of 0.01-1% by weight, preferably in the range of 0.03-0.5% by weight and more preferably in the range of 0.1-0.3% by weight, based on the weight of the polymer, is suitable.

Typically it is sensible to use the catalyst together with a cocatalyst which is a ligand of the formula R1mB, where R1, m and B possess the definitions stated above for the catalyst. Preferably m is 3, B is phosphorus, and the moieties R1 may be alike or different. The cocatalysts in question preferably have trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl moieties.

Examples of cocatalysts are found, for example, in U.S. Pat. No. 4,631,315. A preferred cocatalyst is triphenylphosphine. The cocatalyst is used preferably in amounts in a range of 0.3-5% by weight, preferably in the range of 0.5-4% by weight, based on the weight of the nitrile rubber to be hydrogenated. Preferably, furthermore, the weight ratio of the rhodium-containing catalyst to the cocatalyst is in the range from 1:3 to 1:55, more preferably in the range from 1:5 to 1:45, based on 100 parts by weight of the nitrile rubber to be hydrogenated, use is made suitably of 0.1 to 33 parts by weight of the cocatalyst, preferably 0.5 to 20 and very preferably 1 to 5 parts by weight, in particular more than 2 but less than 5 parts by weight of cocatalyst per 100 parts by weight of the nitrile rubber to be hydrogenated.

The practical implementation of this hydrogenation is well known to the skilled person from U.S. Pat. No. 6,683,136. It is typically accomplished by subjecting the nitrile rubber to be hydrogenated to the action of hydrogen, in a solvent such as toluene or monochlorobenzene, at a temperature in the range from 100 to 150° C. and at a pressure in the range from 50 to 150 bar for 2 to 10 h.

Hydrogenation for the purposes of this invention is understood to be a reaction of the double bonds present in the initial nitrile rubber to an extent of at least 50%, preferably 70-100%, with particular preference 80-100% and in particular 90-100%.

Heterogeneous catalysts, when used, are typically supported catalysts on the basis of palladium, which are supported, for example, on charcoal, silica, calcium carbonate, or barium sulphate.

On account of the ready facility for controlling the molecular weight of the resultant polymer by means of the RAFT modifier it is possible in particular to prepare NBR products (and correspondingly, with downstream additional hydrogenation, HNBR products as well) of low molecular weight and low Mooney viscosity without an automatic need in the case of HNBR, prior to hydrogenation, for deliberate reduction in molecular weight (e.g. by mastication, chemical degradation or metathesis) in a further process step. Where desired, of course, an additional molecular weight reduction of this kind may take place, in particular by metathesis, which is known to the skilled person from, for example, WO-A-02/100941 and also from WO-A-02/100905.

As compared with the optionally hydrogenated nitrile rubbers where the nitrile rubber is obtained by emulsion polymerization, both the nitrile rubbers of the invention and also the hydrogenated nitrile rubbers have the features that they are entirely emulsifier-free and also contain no salts of the kind commonly employed for coagulating the latices after the emulsion polymerization for the purpose of precipitating the nitrile rubber.

The present invention provides, furthermore, vulcanizable mixtures comprising the optionally hydrogenated nitrile rubber and at least one crosslinker. In one preferred embodiment the vulcanizable mixtures further comprise at least one filler.

Optionally it is possible for vulcanizable mixtures of this kind additionally to comprise one or more additives familiar to the skilled person for rubbers. These additives comprise ageing inhibitors, anti-reversion agents, light stabilizers, ozone protectants, processing assistants, plasticizers, mineral oils, tackifiers, blowing agents, dyes, pigments, waxes, resins, extenders, organic acids, vulcanization retarders, metal oxides, and also further filler activators, such as triethanolamine, trimethylolpropane, polyethylene glycol, hexanetriol or aliphatic trialkoxysilanes, for example, or other additives known in the rubber industry (Ullmann's Encyclopedia of Industrial Chemistry, VCH Verlagsgesellschaft mbH, D-69451 Weinheim, 1993, Vol. A 23 "Chemicals and Additives", pp. 366-417).

Suitable crosslinkers include, for example, peroxidic crosslinkers, such as bis(2,4-dichlorobenzoyl)peroxide, dibenzoyl peroxide, bis(4-chlorobenzoyl) peroxide, 1,1-bis (t-butylperoxy)-3,3,5-trimethylcyclohexane, tert-butyl perbenzoate, 2,2 bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous in addition to these peroxidic crosslinkers to use other additives as well that can be employed to help increase the crosslinking yield: suitable examples of such additives include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, zinc acrylate, zinc diacrylate, zinc methacrylate, zinc dimethacrylate, 1,2-polybutadiene or N,N'-m-phenylenedimaleimide.

The total amount of the crosslinker or crosslinkers is typically in the range from 1 to 20 phr, preferably in the range from 1.5 to 15 phr and more preferably in the range from 2 to 10 phr, based on the optionally hydrogenated nitrile rubber.

As crosslinkers it is also possible to use sulphur in elemental, soluble or insoluble form, or sulphur donors.

Suitable sulphur donors include, for example, dimorpholyl disulphide (DTDM), 2-morpholino-dithiobenzothiazole (MBSS), caprolactam disulphide, dipentamethylenethiuram tetrasulphide (DPTT), and tetramethylthiuram disulphide (TMTD).

In the case of the sulphur vulcanization of the optionally hydrogenated nitrile rubber of the invention as well it is also possible to use other additives which can be employed to help increase the crosslinking yield. In principle, however, crosslinking may also take place with sulphur or sulphur donors alone.

Conversely, the crosslinking of the optionally hydrogenated nitrile rubber of the invention may also take place only in the presence of the abovementioned additives, in other words without addition of elemental sulphur or sulphur donors.

Examples of suitable additives which can be employed to help increase the crosslinking yield include dithiocarbamates, thiurams, thiazoles, sulphenamides, xanthogenates, guanidine derivatives, caprolactams and thiourea derivatives.

Dithiocarbamates which can be used include, for example, the following: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams which can be used include, for example, the following: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD), Thiazoles which can be used include, for example, the following: 2-mercaptobenzothiazole (MBT), dibenzothiazyl disulphide (MBTS), zinc mercaptobenzothiazole (ZMBT) and copper 2-mercaptobenzothiazole.

Sulphenamide derivates which can be used include, for example, the following: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthogenates which can be used include, for example, the following: sodium dibutylxanthogenate, zinc isopropyldibutylxanthogenate and zinc dibutylxanthogenate.

Guanidine derivatives which can be used include, for example, the following: diphenylguanidine (DPG), di-o-tolylguanidine (DOTG) and o-tolylbiguanidine (OTBG).

Dithiophosphates which can be used include, for example, the following: zinc dialkyldithiophosphates (chain length of the alkyl moieties C2 to C16), copper dialkyldithiophosphates (chain length of the alkyl moieties $C_2$ to $C_{16}$) and dithiophosphoryl polysulphide.

As caprolactam it is possible, for example, to use dithiobiscaprolactam.

As thiourea derivatives it is possible, for example, to use N,N'-diphenylthiourea (DPTU), diethylthiourea (DETU) and ethylenethiourea (ETU).

Likewise suitable as additives are, for example, the following: zinc diamine diisocyanate, hexamethylenetetramine, 1,3-bis(citraconimidomethyl)benzene and cyclic disulphanes.

Said additives and also the crosslinking agents can be used either individually or else in mixtures. Preference is given to using the following substances for the crosslinking of the nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarhamate, nickel dibutyldithiocarbamate, zinc dibutyldithiocarbamate, zinc dimethyldithiocarbamate and dithiohiscaprolactam.

The crosslinking agents and the abovementioned additives may be used in each case in amounts of about 0.05 to 10 phr, preferably 0.1 to 8 phr, more particularly 0.5 to 5 phr (individual metered addition, based in each case on the active substance) relative to the optionally hydrogenated nitrile rubber.

In the case of the inventive sulphur crosslinking it may also be sensible, in addition to the crosslinking agents and abovementioned additives, to use further organic and/or inorganic substances as well, examples being the following: zinc oxide, zinc carbonate, lead oxide, magnesium oxide, calcium oxide, saturated or unsaturated organic fatty acids and their zinc salts, polyalcohols, amino alcohols, e.g. triethanolamine, and also amines, e.g. dibutylamine, dicyclohexylamine, cyclohexylethylamine and polyetheramines.

Where the optionally hydrogenated nitrile nibbers of the invention are rubbers with repeating units of one or more carboxyl-containing termonomers, crosslinking may also take place via the use of a polyamine crosslinker, preferably in the presence of a crosslinking accelerator. There is no restriction on the polyamine crosslinker provided that it is (1) a compound which contains either two or more amino groups (optionally also in salt form) or (2) a species which during the crosslinking reaction, in situ, forms a compound which forms two or more amino groups. Preference is given to using an aliphatic or aromatic hydrocarbon compound in which at least two hydrogen atoms are replaced either by amino groups or else by hydrazide structures (the latter being a structure "C(=O)NHNH$_2$").

Examples of polyamine crosslinkers (ii) of this kind are as follows:

Aliphatic polyamines, preferably hexamethylenediamine, hexamethylenediamine carbamate, tetramethylenepentamine, hexamethylenediamine-cimmamaldehyde adduct or hexamethylenediamine dibenzoate;

Aromatic polyamines, preferably 2,2-bis(4-(4-aminophenoxy)phenyl)propane, 4,4-methylenedianiline, m-phenylenediamine, p-phenylenediamine or 4,4'-methylenebis(o-chloroaniline;

Compounds having at least two hydrazide structures, preferably isophthalic dihydrazide, adipic dihydrazide or sebacic dihydrazide.

Particularly preferred are hexamethylenediamine and hexamethylenediamine carbamate.

The amount of the polyamine crosslinker in the vulcanizable mixture is typically in the range from 0.2 to 20 parts by weight, preferably in the range from 1 to 15 parts by weight and more preferably in the range from 1.5 to 10 parts by weight, based on 100 parts by weight of the optionally hydrogenated nitrile rubber.

As crosslinking accelerators it is possible to use, in combination with the polyamine crosslinker, any that are known to the skilled person, preferably a basic crosslinking accelerator. Use may be made, for example, of tetramethylguanidine, tetraethylguanidine, diphenylguanidine, di-o-tolylguanidine (DOTG), o-tolylbiguanidine and di-o-tolylguanidine salt of dicathecolboric acid. Use may also be made of aldehyde-amine crosslinking accelerators such as, for example, n-butylaldehyde-aniline. Particular preference as crosslinking accelerator is given to at least one bicyclic or polycyclic aminic base. These are known to the skilled person. Particular suitability is possessed by 1,8-diazabicyclo[5.4.0]undec-7-ene (DBU), 1,5-diazabicyclo[4.3.0]-5-nonene (DBN), 1,4-diazabicyclo[2.2.2]octane (DABCO), 1,5,7-triazabicyclo[4.4.0]dec-5-ene (TBD), 7-methyl-1,5,7-triazabicyclo[4.4.0]dec-5-ene (MTBD).

The amount of the crosslinking accelerator in this case is typically in a range from 0.5 to 10 parts by weight, preferably 1 to 7.5 parts by weight, more particularly 2 to 5 parts by weight, based on 100 parts by weight of the optionally hydrogenated nitrile rubber.

The vulcanizable mixture based on the optionally hydrogenated nitrite rubber of the invention may in principle also comprise vulcanization onset retarders. These include cyclohexylthiophthalimide (CTP), N,N'-dinitrosopentamethylenetetramine (DNPT), phthalic anhydride (PTA) and diphenylnitrosamine. Cyclohexylthiophthalimide (CTP) is preferred.

Aside from the addition of the crosslinker or crosslinkers, the optionally hydrogenated nitrile rubber of the invention may also be mixed with further customary rubber additives.

Fillers which can be used include, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Suitable filler activators include, in particular, organic silanes, such as, for example, vinyltrimethyloxysilane, vinyldimethoxymethylsilane, vinyltriethoxysilane, vinyltris(2-methoxy-ethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of 74 to 10 000 g/mol. The amount of filler activators is typically 0 to 10 phr, based on 100 phr of the optionally hydrogenated nitrile rubber.

As ageing inhibitors it is possible to add to the vulcanizable mixtures ageing inhibitors known from the literature. These inhibitors are used typically in amounts of about 0 to 5 phr, preferably 0.5 to 3 phr, per 100 phr of the optionally hydrogenated nitrile rubber.

Suitable phenolic ageing inhibitors are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, thioether-containing sterically hindered phenols, 2,2'-methylenebis(4-methyl-6-tert-butylphenol) (BPH) and also sterically hindered thiobisphenols.

If discolouration of the nitrile rubber is not important, aminic ageing inhibitors are used as well, examples being mixtures of diaryl-p-phenylenediamines (DTPD), octylated diphenylamine (ODPA), phenyl-α-naphthylamine (PAN), phenyl-β-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD) and N,N'-bis-1,4-(1,4-dimethylpentyl)-p-phenylenediamine (77PD).

The other ageing inhibitors include phosphites such as tris(nonylphenyl) phosphite, polymerized 2,2,4-trimethyl-1, 2-dihydroquinoline (TMQ), 2-mercaptobenzimidazole (MBI), methyl-2-mercaptobenzimidazole (MMBI), zinc methylmercaptobenzimidazole (ZMMBI). The phosphites are used generally in combination with phenolic ageing inhibitors. TMQ, MBI and MMBI are used especially when vulcanization takes place peroxidically.

As mould release agents contemplation is given, for example, to saturated or partly unsaturated fatty acids and oleic acids and their derivatives (fatty acid esters, fatty acid salts, fatty alcohols, fatty acid amides), which are preferably used as a constituent of the mixture, and also to products which can be applied to the mould surface, such as, for example, products based on low molecular mass silicone compounds, products based on fluoropolymers, and products based on phenolic resins.

As a constituent of the mixture the mould release agents are used in amounts of about 0 to 10 phr, preferably 0.5 to 5 phr, based on 100 phr of the optionally hydrogenated nitrile rubber.

Also possible is reinforcement with strengthening agents (fibres) of glass in accordance with the teaching of U.S. Pat. No. 4,826,721, as is reinforcement by cords, woven fabrics, fibres of aliphatic and aromatic polyamides (Nylon®, Aramid®), polyesters and natural fibre products.

The present invention provides furthermore, a process for producing vulcanizates which is characterized in that the above-described vulcanizable mixture is subjected to crosslinking. Crosslinking is brought about typically either by at least one crosslinker or else photochemical activation.

In the case of the photochemically activated vulcanization it is possible as UV activators to use the activators known typically to the skilled person, examples being benzophenone, 2-methyl-benzophenone, 3,4-dimethyibenzophenone, 3-methylbenzophenone, 4,4'-bis(diethyl-amino)benzophenone, 4,4'-dihydroxybenzophenone, 4,4'-bis[2-(1-propenyl)phenoxy]-benzophenone, 4-(diethylamino)benzophenone, 4-(dimethylamino)benzophenone, 4-benzoylbiphenyl, 4-hydroxybenzophenone, 4-methylbenzophenone, benzophenone-3,3',4,4'-tetracarboxylic dianhydride, 4,4'-bis(dimethylamino)benzophenone, acetophenone, 1-hydroxycyclohexyl phenyl ketone, 2,2-diethoxyacetophenone, 2,2-dimethoxy-2-phenylacetophenone, 2-benzyl-2-(dimethylamino)-4'-morpholinobutyrophenone, 2-hydroxy-2-methylpropiophenone, 2-hydroxy-4'-(2-hydroxyethoxy)-2-methylpropiophenone, 3'-hydroxyacetophenone, 4'-ethoxyacetophenone, 4'-hydroxyacetophenone, 4'-phenoxyacetophenone, 4'-tert-butyl-2',6'-dimethylacetophenone, 2-methyl-4'-(methylthio)-2-morpholinopropiophenone, diphenyl(2,4,6-trimethylbenzoyl)phosphine oxide, phenylbis(2,4,6-trimethylbenzoyl)phosphine oxide, methyl benzoylformate, benzoin, 4,4'-dimethoxybenzoin, benzoin methyl ether, benzoin ethyl ether, benzoin isopropyl ether, benzoin isobutyl ether, 4,4'-dimethylbenzyl, hexachlorocyclopentadienes or combinations thereof.

The vulcanization takes place typically as part of a shaping process, preferably with employment of an injection moulding process.

The invention also provides, therefore, the specific moulding obtainable through the aforementioned vulcanization process. There are a large number of mouldings that it is possible to produce, examples being seals, caps, hoses or membranes. It is possible, for example, to produce O-ring seals, flat seals, corrugated gaskets, sealing sleeves, sealing caps, dust protection caps, plug seals, thermal insulation hoses (with and without addition of PVC) oil cooler hoses, air intake hoses, servocontrol hoses or pump diaphragms.

EXAMPLES

In the examples below, mass spectrometry (MS) was used to show unambiguously that the nitrile rubber of the invention, as end group of the polymer chains, comprises a modifier fragment which is based on the modifier used. Furthermore, the activity of the polymers prepared in this way and comprising the modifier fragment, as macromodifiers for further use, was demonstrated unambiguously through the production of an NBR-block-polystyrene system.

The following abbreviations are used at certain points below:

| | |
|---|---|
| ACN | acrylonitrile |
| 1,3-BD | 1,3-butadiene |
| DMAc | dimethylacetamide |
| MCB | monochlorobenzene |
| DoPAT | dodecylpropanoic trithiocarbonate |
| VAm 110 | 1,1'-azobis(N-butyl-2-methylpropionamide) (Wako Pure Chemical Industries Ltd) |
| V30 | 1-[(1-cyano-1-methylethyl)azo]formamide (Wako Pure Chemical Industries Ltd) |
| Vazo ® 88: | 1,1'-azobis(cyclohexanecarbonitrile) (DuPont) |
| $M_w$ | weight-average molecular weight |
| $M_n$ | number-average molecular weight |
| PDI | polydispersity index (ratio of $M_w$ to $M_n$) |

Acrylonitrile Content:

The nitrogen content of the nitrile rubbers of the invention, for determining the acrylonitrile content, was determined by the Kjeldahl method in accordance with DIN 53 625. Only in Examples 24 and 25 was the acrylonitrile content determined from the glass transition temperature by means of the "Gordon-Taylor Equation" Tg=1.4564*[ACN]−77.147

Glass Transition Temperature:

The glass transition temperature, and also its onset and offset points, is determined by means of Differential Scanning calorimetry (DSC) in accordance with ASTM E 1356-03 or DIN 11357-2.

Molecular Weights and Polydispersity Index:

The molecular weights, in the form of the number-average molecular weight ($M_n$) and the weight-average molecular weight ($M_w$), and also the polydispersity index, were determined by means of gel permeation chromatography (GPC) in accordance with DIN 55672-1 (part 1: tetrahydrofuran THF as solvent).

Gel Content:

The determination of the insoluble fractions (referred to as the "gel content") was made after 22-hour dissolution of a sample at room temperature in methyl ethyl ketone (MEK) solvent at a polymer concentration of 10 g/l with subsequent one-hour ultracentrifugation at 20 000 rpm and 25° C.

Microstructure:

The microstructure of the individual polymers was determined by means of NMR (instrument: Bruker DPX400 with XWIN-NMR 3.1 software, recording frequency 400 MHz, solvent $CDCl_3$).

The chemicals listed in Tables 1, 2 and 5 were obtained from the chemicals trade or from the applicant's production facilities. The "DoPAT" modifier used (dodecylpropanoic acid trithiocarbonate, as shown in the formula below) was synthesized in the laboratory in accordance with the preparation process described in Macromolecules (2005), 38 (6), 2191-2204.

Example 1-5

Inventive

Preparation of Nitrile Rubbers ("NBR") in Different Organic Solvents with Different Modifier Concentrations The nitrile rubbers NBR #1 to #5, used in the series of examples below, were prepared in accordance with the base formula reported in Table 1, with all of the ingredients being reported in parts by weight per 100 parts by weight of the monomer mixture. Table 1 also specifies the particular polymerization conditions.

All of the apparatus, prior to contact with 1,3-butadiene, is rendered oxygen-free by three-fold evacuation and flushing with argon.

In Example 1, polymerization took place as follows:

Vazo® 88 284.9 mg (1.17 mmol, corresponding to 0.31 phm) and 204 mg of DoPAT (0.583 mmol, corresponding to 0.22 phm) were dissolved in 50 ml (51 phm) of dimethylacetamide, 43 ml of acrylonitrile (653.3 mmol, corresponding to 37 phm) were added, and the solution was degassed with argon for 10 minutes. The monomer/initiator solution was transferred to the reactor, which was closed and rendered free of oxygen by three-fold evacuation/flushing with argon. A pressurized burette was used to meter in 90 ml of 1,3-butadiene (1077 mmol, corresponding to 63 phm) at a pressure of 3 bar and the reaction was started by heating to 100° C. The attainment of this temperature marks the start of polymerization. The course of the polymerization was monitored by gravimetric determinations of conversion, by means of interim sampling. After a polymerization time of 9 hours, the heating source was removed, excess 1,3-butadiene was removed by admission of air, after the reactor had been cooled, and the polymer was obtained by precipitation from ethanol, which contained the quantity of pyrocatechol/hydroquinone as stabilizer indicated in Table 1. The polymer was subsequently dried under a high vacuum.

The polymerization of Examples 2 to 5 was carried out similarly, with variations in the amount of modifier and of initiator and also in the nature of the solvent (see Table 1). Where the polymerization conditions differed from those in Example 1, this is likewise indicated in Table 1.

Example 6

Inventive

Preparation of a NBR Terpolymer with Hydroxyethyl Acrylate (HEA) as Termonomer in Organic Solvent The terpolymer NBR #6 was synthesized in accordance with the general synthesis instructions given above for Example 1. Only the amounts of monomers used were modified; the individual amounts of the ingredients can be found in Table 1. Hydroxyethyl acrylate (HEA) and acrylonitrile (ACN) were added to the solvent prior to degassing with argon. The reaction was terminated after 6 hours (final conversion 39%).

Examples 7 and 8

Inventive

Preparation of an NBR-Block-Styrene Terpolymer in Organic Solvent

In Example 7 a low molecular mass NBR (NBR #7) was prepared deliberately, and was subsequently used in Example 8 as a RAFT macromer. This polymerization to give NBR #7 took place in accordance with the general synthesis instructions given for Example 1, with adaptation of the amount of modifier (increased to 2.22 phm, in order to obtain a low molecular weight). The individual amounts of the ingredients can be found in Table 1. The reaction was terminated after 9 h, at a final conversion of 48%, and the polymer was isolated as described above (Examples 1 to 5).

Subsequently, in Example 8, 2.74 g of the RAFT micrometer of NBR #7 obtained in Example 7 (Mn=12 000 g/mol) were dissolved in 2 g of DMAc and admixed with 2.79 g (26.8 mmol, corresponding to 50 phm) of styrene. The reaction vessel was closed with a septum and the reaction solution was degassed with argon for 10 minutes by means of a cannula. The reaction was started by immersion into a heated oil bath (T=100° C.) and terminated after 13 hours, at a final conversion of 9.2%, by admission of air and precipitation in MeOH. The supernatant was decanted off and the polymer sample NBR #8 was dried under a high vacuum.

TABLE 1

Examples 1-8 (inventive); formulas and polymerization conditions

| | | Identification: | | | | | | | |
|---|---|---|---|---|---|---|---|---|---|
| | | NBR 1 | NBR 2 | NBR 3 | NBR 4 | NBR 5 | NBR 6 | NBR 7 | NBR 8 |
| Formula: | | | | | | | | | |
| Acrylonitrile | phm | 37 | 37 | 37 | 37 | 37 | 30 | 37 | — |
| Butadiene | phm | 63 | 63 | 63 | 63 | 63 | 50 | 63 | — |
| Hydroxyethyl acrylate | phm | — | — | — | — | — | 20 | — | — |
| Styrene | phm | — | — | — | — | — | — | — | 50 |
| DoPAT-NBR#7 | phm | — | — | — | — | — | — | — | 50 |
| DoPAT | phm | 0.222 | 0.666 | 0.222 | 0.666 | 3.31 | 0.197 | 2.22 | — |
| DMAc | phm | 51 | 51 | — | — | 202 | 45 | 51 | 63 |
| MCB | phm | — | — | 56 | 56 | — | — | — | — |
| Vazo ® 88 | phm | 0.310 | 0.310 | 0.310 | 0.310 | 0.23 | 0.275 | 0.310 | 0.056 |
| Pyrocatechol/ hydroquinone | phm | 5.7 | 5.7 | 5.7 | 5.7 | 5.7 | 5.7 | 5.7 | 5.7 |
| Reaction conditions: | | | | | | | | | |
| Polymerization temperature | ° C. | 100 | 100 | 100 | 100 | 100 | 100 | 100 | 100 |
| Polymerization time | h | 9 | 9 | 9 | 9 | 5 | 6 | 9 | 13 |
| Final conversion | % | 50 | 49 | 51 | 53 | 28 | 39 | 48 | 9.2 |

Comparative Examples A and B

NBR Preparation in Emulsion Using TDM

The nitrile rubbers NBR #A and #B used in the example series below were prepared in accordance with the base formula specified in Table 2, with all of the ingredients being reported in parts by weight per 100 parts by weight of the monomer mixture. Table 2 also gives the respective polymerization conditions.

The nitrile rubbers were produced on a batchwise basis, in a 5 L autoclave with agitator mechanism. For the autoclave batches, 1.25 kg of the monomer mixture and a total water quantity of 2.1 kg were used in each case. Of this quantity of water, 1.9 kg was included in the initial autoclave charge with the Edenor® HtiCT emulsifier and sodium hydroxide (pH of the soap solution: 11.0+/−1.0) and flushed with a stream of nitrogen. Thereafter, the destabilized monomers and the amount of molecular weight modifier TDM indicated in Table 2 were added, and the reactor was closed. After the contents of the reactor had been thermostated, the polymerizations were started by the addition of aqueous solutions in the form of the activator solution and also of para-menthane hydroperoxide (Trigonox NT50).

The course of the polymerization was monitored by means of gravimetric determinations of conversion. When the conversions indicated in Table 2 were reached, the polymerization was halted by addition of an aqueous solution of diethylhydroxylamine. Unreacted monomers and other volatile constituents were removed by means of steam distillation.

Before the respective NBR latex was coagulated, it was admixed in each case with a 50% dispersion of Vulkanox® BKF (0.3% by weight Vulkanox® BKF based on NBR solids). This was followed by coagulation, by washing, and by the drying of the resulting crumb.

TABLE 2

Examples A and B (comparative); formulas and polymerization conditions

| Identification: | | NBR A | NBR B |
|---|---|---|---|
| Formula: | | | |
| Acrylonitrile | phm | 37 | 37 |
| Butadiene | phm | 63 | 63 |
| TDM | phm | 0.7 | 1.2 |
| Water | phm | 200 | 200 |
| Edenor ® HTiCT, Na/K salt | phm | 2.0 | 2.0 |
| Trigonox ® NT50 | phm | 0.020 | 0.020 |
| Activator solution | phm | 0.022 | 0.022 |
| Diethylhydroxylamine | phm | 0.4 | 0.4 |
| Vulkanox ® BKF | phr | 0.3 | 0.3 |
| Reaction conditions: | | | |
| Polymerization temperature | °C. | 13 | 13 |
| Polymerization time | h | 8.5 | 9.5 |
| Final conversion | % | 56 | 56 | where:
TDM tertiary dodecyl mercaptan (Lanxess Deutschland GmbH; preparation also described in WO-A-2008/142037)
Edenor ® HTiCT, Na/K salt selectively hydrogenated tallow fatty acid, hydrolysed with KOH/NaOH (Cognis GmbH)
Trigonox ® NT50 para-menthane hydroperoxide Activator solution containing 0.986 g of Fe(II)SO$_4$ * 7 H$_2$O and 2.0 g of Rongalit ® C (sodium formaldehyde-sulphoxylate hydrate, ≥98% purity) to 400 g of water
Vulkanox BKF 2,2'-Methylenebis(6-tert-butyl)-para-cresol (Lanxess Deutschland GmbH)
Precipitating solution Ethanol containing 5.7 phm of pyrocatechol/hydroquinone

TABLE 3

Analytical results for Examples 1-8 and also NBR A and B

| | | Identification: | | | | | |
|---|---|---|---|---|---|---|---|
| | | NBR 1 | NBR 2 | NBR 3 | NBR 4 | NBR 5 | NBR 6 |
| GPC results: | | | | | | | |
| Mn | g/mol | 58 000 | 28 100 | 66 000 | 30 100 | 6600 | 42 800 |
| Mw | g/mol | 98 000 | 44 600 | 126 000 | 45 700 | 8700 | 75 300 |
| Polydispersity | | 1.7 | 1.6 | 1.9 | 1.5 | 1.3 | 1.8 |
| ACN: | | | | | | | |
| bound ACN | % | 37.9 | 37.3 | 36.1 | 34.1 | n.d. | 36.9 |
| DSC figures: | | | | | | | |
| Tg | °C. | −24.0 | −21.8 | −24.8 | −24.8 | n.d. | −19.6 |
| Onset | °C. | −28.8 | −26.3 | −29.5 | −29.3 | n.d. | −28.3 |
| Offset | °C. | −19.0 | −16.6 | −19.6 | −19.9 | n.d. | −10.5 |
| delta Tg | °C. | 9.8 | 9.7 | 9.9 | 9.3 | n.d. | 17.9 |
| Gel measurement: | | | | | | | |
| Gel content | % | 0.6 | 5.0 | 0.5 | 0.7 | n.d. | 0.8 |
| Microstructure (1H NMR): | | | | | | | |
| ACN | % | 38.1 | 38.9 | 37.5 | 37.0 | n.d. | 37.4 |
| 1,4 BD | % | 53.4 | 52.9 | 54.0 | 54.4 | n.d. | 43.8 |
| 1,2 vinyl BD | % | 8.5 | 8.2 | 8.5 | 8.6 | n.d. | 6.0 |
| Hydroxyethyl acrylate | % | n.d. | n.d. | n.d. | n.d. | n.d. | 12.8 |

TABLE 3-continued

Analytical results for Examples 1-8 and also NBR A and B

| | Identification: | | | |
|---|---|---|---|---|
| | NBR 7 | NBR 8 | NBR A | NBR B |
| GPC results: | | | | |
| Mn | 12 500 | 16 100 | 64 000 | 38 600 |
| Mw | 16 000 | 21 100 | 146 100 | 76 100 |
| Polydispersity | 1.3 | 1.3 | 2.3 | 2.0 |
| ACN: | | | | |
| bound ACN | 37.4 | 25.3 | 37.0 | 36.6 |
| DSC figures: | | | | |
| Tg | −28.5 | −20.3 | −23.2 | −28.5 |
| Onset | −34.1 | −29.4 | −27.4 | −34.2 |
| Offset | −22.9 | −12.9 | −18.2 | −22.6 |
| delta Tg | 11.2 | 16.6 | 9.2 | 11.5 |
| Gel measurement: | | | | |
| Gel content | 0.4 | 0.5 | 0.5 | 0.6 |
| Microstructure (1H NMR): | | | | |
| ACN | n.d. | n.d. | 39.2 | 38.7 |
| 1,4 BD | n.d. | n.d. | 54.5 | 55.0 |
| 1,2 vinyl BD | n.d. | n.d. | 6.3 | 6.3 |
| Hydroxyethyl acrylate | n.d. | n.d. | n.d. | n.d. |

Mass-Spectrometric Investigations on NBR #5 for Detecting the Structural Elements of the Modifier Used in the Polymer:

Instrument System:

The ESI_MS spectra (Electrospray Ionization-Mass Spectra) were recorded on an LXQ mass spectrometer from ThermoFisher Scientific, San Jose, Calif., USA. The instrument is equipped with an ionizing source operating under atmospheric pressure in atomizer electrospray mode. The instrument is calibrated in the range from 195 to 1822 m/z. Calibration material used is a mixture of caffeine, Met-Arg-Phe-Ala acetate (MRFA) and a mixture of fluorinated phosphazenes (Ultramark 1621) (all substances from Aldrich). The ionizing voltage used is 4.5 kV, with nitrogen having a dimensionless flux of 2 (approximately 3 $L \cdot min^{-1}$) being used as flushing gas, and with a flow rate of 12 (approximately 1 $L \cdot min^{-1}$) as carrier gas. The spectra are recorded in the 150-2000 m/z range with a capillary voltage of 110 V and a capillary temperature of 275° C. The LXQ system is coupled with a 1200 HPLC system (Agilent, Santa Barbara, Calif.; USA) composed of the following components: a G1322A degasser, a double pump (G1312A), a sample collector (G1367B) and a thermostated column chamber. Separation takes place on two SEC columns (Polymer Laboratories, Mesopore 250×4.6 mm, particle diameter 3 μm and Mesopore 50×4.6 mm (preliminary column)) at 30° C. The eluent used is THF, with a flow rate of 0.3 $ml \cdot min^{-1}$. The mass spectrometer is connected with the column in parallel to an RI detector (G1362A with SS420x A/D). The eluent is passed at 0.27 $ml \cdot min^{-1}$ directly through the RI detector, and 30 μl·min-1 are introduced into the electron spray source, following addition of a 100 μM solution of sodium iodide in methanol with a flow rate of 20 $μl \cdot min^{-1}$ using a Micro-flow HPLC pump (Teledyne ISCO, Model 100DM).

Sample Processing:

The samples are prepared with a polymer concentration of 2 $mg \cdot ml^{-1}$ in THF and purified using a 0.45 μm PTFE filter. Of this solution, 20 μl are supplied to the system.

Interpretation of the Spectra:

FIGS. 1/3 and 2/3 show the mass spectrum of sample NBR #5, and an extract of the spectrum, respectively. The theoretical m/z values reported in Table 5 were calculated using absolute molar masses and with the assumption that the Z or R end groups of the DoPAT modifier used are located on the ends of the polymer chains. Comparison of the calculated m/z values with those actually measured shows a very good match for this method, with deviations of less than 0.1 m/z. The polymer end groups originating from the modifier used are therefore unambiguously detectable.

TABLE 4

Figure 3:
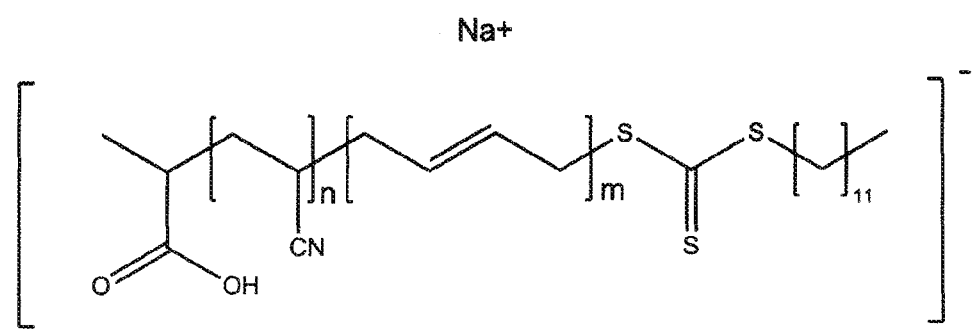
FIG. 3 depicts the structure of the RAFT=NBR prepared in accordance with Example 7.

Possible copolymer compositions and resultant m/z values (+Na⁺)
The indices n and m relate to the acrylonitrile repeating units and to the butadiene repeating units with polymer obtained (see FIG. 3/3).

| n(AN) | m(BD) | m/z theo | m/z exp | delta m/z |
|---|---|---|---|---|
| 6 | 9 | 1177.76 | 1177.83 | 0.07 |
| 5 | 10 | 1178.78 | 1178.83 | 0.05 |
| 4 | 11 | 1179.80 | 1179.83 | 0.03 |
| 3 | 12 | 1180.82 | 1180.83 | 0.01 |
| 2 | 13 | 1181.84 | 1181.75 | 0.09 |

Examples 9-16

Inventive

Procedure for Example 9

The amount indicated in Table 5 of the respective initiator and also of the modifier was dissolved in 95 ml (129 phm) of dimethylacetamide, 34 ml of acrylonitrile (519 mmol, corresponding to 38 phm) were added, and the mixture was degassed with argon for 10 minutes. The monomer/initiator solution was transferred to the reactor, which was closed and rendered free of oxygen by three-fold evacuation/flushing with argon. Using a pressure burette, 71 ml of 1,3-butadiene (847 mmol, corresponding to 62 phm) were metered in under a pressure of 3 bar, and the reaction was started by heating to 100° C. The attainment of this temperature marked the start of polymerization. The course of the polymerization was monitored by gravimetric determinations of conversion, by means of interim sampling. After a polymerization time of 22 hours, the heating source was removed, excess 1,3-butadiene was removed by admission of air, after the reactor had been cooled, and the polymer was obtained by precipitation from ethanol, which contained the quantity of pyrocatechol/hydroquinone as stabilizer indicated in Table 1. ethanolic stabilizer solution obtained. The polymer was subsequently dried under a high vacuum.

The polymerizations of Examples 10 to 16 were carried out similarly, with variations in the amount of initiator, modifier, solvent and reaction time (Table 5). Where the polymerization conditions differed from those in Example 9, this is likewise indicated in Table 5.

TABLE 5

Examples 9-16; formulas and polymerization conditions

| | | Identification: | | | | | | | |
|---|---|---|---|---|---|---|---|---|---|
| | | NBR 9 | NBR 10 | NBR 11 | NBR 12 | NBR 13 | NBR 14 | NBR 15 | NBR 16 |
| Formula: | | | | | | | | | |
| Acrylonitrile | phm | 38 | 38 | 38 | 38 | 38 | 38 | 38 | 38 |
| Butadiene | phm | 62 | 62 | 62 | 62 | 62 | 62 | 62 | 62 |
| DMAc | phm | 129 | 129 | 129 | | | | | |
| MCB | phm | | | | 131 | | | | |
| 1,4-Dioxane | phm | | | | | 122 | 129 | | |
| tert-Betanol | phm | | | | | | | 129 | |
| Isobutyronitrile | phm | | | | | | | | 129 |
| VAm 110 | phm | | | | | | 0.370 | 0.370 | 0.370 |
| V30 | phm | 0.167 | 0.167 | 0.251 | 0.168 | 0.167 | — | — | — |
| DoPAT | phm | 0.08 | 0.04 | 0.12 | 0.08 | 0.08 | 0.08 | 0.08 | 0.08 |
| Pyrocatechol/hydroquinone | phm | 5.7 | 5.7 | 5.7 | 5.7 | 5.7 | 5.7 | 5.7 | 5.7 |
| Reaction conditions: | | | | | | | | | |
| Polymerization temperature | °C. | 100 | 100 | 100 | 100 | 100 | 100 | 100 | 100 |
| Polymerization time | h | 22 | 22 | 22 | 18 | 18 | 22 | 22 | 22 |
| Final conversion | % | 37 | 36 | 43 | 40 | 40 | 29 | 28 | 29 |

TABLE 6

Analytical results for Examples 9-16

| | | Example | | | | | | | |
|---|---|---|---|---|---|---|---|---|---|
| | | NBR 9 | NBR 10 | NBR 11 | NBR 12 | NBR 13 | NBR 14 | NBR 15 | NBR 16 |
| GPC results: | | | | | | | | | |
| Mn | g/mol | 95 909 | 118 731 | 85 042 | 98 733 | 104 781 | 91 571 | 85 619 | 85 011 |
| Mw | g/mol | 210 140 | 325 782 | 199 578 | 232 514 | 337 279 | 197 607 | 166 135 | 151 484 |
| Polydispersity | | 2.2 | 2.7 | 2.3 | 2.4 | 3.2 | 2.2 | 1.9 | 1.8 |
| ACN content | | | | | | | | | |
| Bound ACN | % | n.d. | n.d. | n.d. | 34.5 | n.d. | n.d. | n.d. | n.d. |
| Gel measurement: | | | | | | | | | |
| Gel content | % | n.d. | n.d. | n.d. | 0.4 | 0.7 | n.d. | n.d. | n.d. |
| Microstructure (1H NMR): | | | | | | | | | |
| ACN | % | n.d. | n.d. | n.d. | 36.0 | n.d. | n.d. | n.d. | 39.2 |
| 1,4 BD | % | n.d. | n.d. | n.d. | 55.0 | n.d. | n.d. | n.d. | 54.5 |
| 1,2 vinyl BD | % | n.d. | n.d. | n.d. | 9.0 | n.d. | n.d. | n.d. | 6.3 |

Examples 17-23

Inventive

Examples 17-21 with Additional Use of 1,6-hexanediol diacrylate (HDODA) or 2-hydroxyethyl acrylate (HEA), and Examples 22 and 23 without Termonomer In Examples 17-23, the amount of the Vazo® 88 initiator and of the DoPAT RAFT modifier indicated in Table 7 were dissolved in the stated volume of the DMAc solvent, the amount of acrylonitrile likewise stated in Table 7, and also, in Examples 17-21, additionally HDODA, and in Example 21, moreover, additionally HEA, were added, and the solution was degassed with argon for 10 minutes. This monomer/initiator solution was transferred to the reactor, which was closed and rendered free of oxygen by three-fold evacuation/flushing with argon. The quantity of 1,3-butadiene indicated in Table 7 was subsequently metered in using a pressurized burette, under a pressure of 3 bar, and the reaction was started by heating to 100° C. The attainment of this temperature marked the start of polymerization. The course of the polymerization was monitored by gravimetric determinations of conversion, by means of interim sampling.

In Examples 18, 20 and 23, after a polymerization time of 2.5 and 6 hours, respectively, 128 mg of Vazo® 88 (0.523 mmol, corresponding to 0.15 phm), in each case in solution in 5 ml of dimethylacetamide, were metered subsequently into the reaction mixture.

For all of the examples, after 9 hours, the heating source was removed, excess 1,3-butadiene was removed by admission of air, after the reactor had been cooled, and the polymer was obtained by precipitation from ethanol, which contained the amount of pyrocatechol/hydroquinone as stabilizer indicated in Table 1. The polymer was subsequently dried under a high vacuum.

Examples 24-25

Inventive

Use of Dibenzoyl Trithiocarbonate (DiBenT) and Also Cumyl Phenyl Dithioacetate (CPDA) as RAFT Modifiers The amounts of Vazo® 88 and of the specified RAFT modifier indicated in Table 8 were dissolved in 50 ml (51 phm) of dimethylacetamide, 35.6 g of acrylonitrile (671.0 mmol, corresponding to 38 phm) were added and the solution was degassed with argon for 10 minutes. This monomer/initiator solution was transferred to the reactor, which was closed and rendered free of oxygen by three-fold evacuation/flushing with argon. Using a pressurized burette, 57.3 g of 1,3-butadiene (1059.90 mmol, corresponding to 62 phm) are metered in and the reaction is started by heating to 100° C. The course of the polymerization was monitored by gravimetric determinations of conversion. After 9 hours, the heating source was removed, excess 1,3-butadiene was removed by admission of air, after the reactor had been cooled, and the polymer was obtained by precipitation from ethanolic stabilizer solution. The polymer was subsequently dried under a high vacuum.

TABLE 7

Examples 17 to 23, formulas and polymerization conditions

| Example | Remark | Monomers ANC mmol | 1,3-BD mmol | HDODA mmol | HEA mmol | $[m]_{0,tot}$ M | Initiator Vazo® 88 mmol | $[Ini]_0$ mM | RAFT modifier DoPAT mmol | DMAc ml | $t_{Poly}$ h | $T_{Poly}$ °C | GPC Analysis of the polymer after end of the reaction time Mn g/mol | Mw g/mol | PDI PDI | Conversion % |
|---|---|---|---|---|---|---|---|---|---|---|---|---|---|---|---|---|
| 17 | without reactivation | 478 | 847 | 6.63 | ./. | 6.7 | 0.876 | 4.45 | 0.436 | 95 | 9 | 100 | 55 000 | 128 000 | 2.3 | 44 |
| 18 | with reactivation | 574 | 1016 | 7.96 | ./. | 6.7 | 1.046 | 4.44 | 0.523 | 113 | 9 | 100 | 52 000 | 126 000 | 2.4 | 51 |
| 19 | without reactivation | 574 | 1016 | 11.3 | ./. | 6.7 | 1.046 | 4.44 | 0.523 | 113 | 9 | 100 | 42 000 | 99 000 | 2.4 | 38 |
| 20 | with reactivation | 574 | 1016 | 15.9 | ./. | 6.7 | 1.046 | 4.44 | 0.523 | 113 | 9 | 100 | 49 000 | 143 000 | 2.9 | 49 |
| 21 | without reactivation | 515 | 916 | 8.43 | 159 | 6.7 | 1.046 | 4.44 | 0.523 | 106 | 9 | 100 | 53 000 | 135 000 | 2.6 | 42 |
| 22 | without reactivation | 574 | 1016 | ./. | ./. | 6.7 | 1.046 | 4.44 | 0.523 | 113 | 9 | 100 | 43 000 | 73 000 | 1.7 | 36 |
| 23 | with reactivation | 574 | 1016 | ./. | ./. | 6.7 | 1.046 | 4.44 | 0.523 | 113 | 9 | 100 | 38 000 | 68 000 | 1.8 | 45 | where
$[m]_{0,tot}$ represents the concentration of the monomers at the start of polymerization in the solvent,
$[Ini]_0$ represents the concentration of the Vazo 88 initiator at the start of polymerization in the solvent, and
$T_{Poly}$ represents the polymerization temperature and $t_{Poly}$ the polymerization time.

TABLE 8

Examples 24 and 25

| Example | Type of raft modifier mM | Vazo ® 88 initiator mM | Conversion after 9 h reaction time % | Molecular weight $M_n$ g/mol | PDI | Glass transition temperature $T_g$ °C. | ACN content % |
|---|---|---|---|---|---|---|---|
| 24 | DiBenT 6.4 | 6.4 | 51 | 31 600 | 1.75 | −22.5 | 37.5 |
| 25 | DPDA 6.4 | 6.4 | 51 | 42 000 | 1.77 | −22.1 | 37.8 |

What is claimed is:

1. Nitrile rubber comprising
(i) repeating units derived from at least one conjugated diene, at least one α,β-unsaturated nitrile and optionally one or more further copolymerizable monomers, and
(ii) one or more structural elements of the general formulae (I), (II), (III), (IV) or (V)

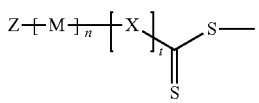
(I)

(II)

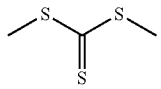
(III)

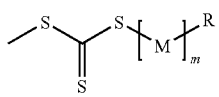
(IV)

(V)

in which

Z is, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulphamoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides, R (a), if m≠0, possesses the same definitions as the moiety Z, and
(b), if m=0, is, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, carbamoyl, alkoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides, M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides, n and m are alike or different and are each in the range from 0 to 10 000, t is 0 or 1, if n=0, and is 1, if n≠0, and X is $C(Z_2)$, N(Z), P(Z), P(=O)(Z), O, S, S(=O) or $S(=O)_2$, it being possible for Z in these moieties to possess the same definitions as set out above.

2. Nitrile rubber according to claim 1, in which the moieties Z and R are each singly or multiply substituted, preferably by one or more substituents which are able to adopt all of the definitions applying to Z, more preferably by one or more substituents selected from the group consisting of fluoro, chloro, bromo or iodo, alkyl, carbocyclyl, heterocyclyl, aryl, heteroaryl, arylalkyl, heteroarylalkyl, alkoxy, aryloxy, alkylthio, arylthio, amino, amido, carbamoyl, carbonyl, carboxyl, oxycarbonyl, oxysulphonyl and epoxy.

3. Nitrile rubber according to claim 1, comprising as general structural elements (ii)

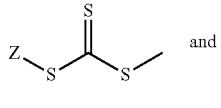
(VIb-1)

and

—R
(VIb-2)

in which

Z possesses the definitions given in claim 1 and

R possesses the definitions given in claim 1, albeit with the restriction that R, following hemolytic fission of the bond to the adjacent bonded atom in the unhydrogenated or hydrogenated nitrile rubber, forms alternatively a secondary, tertiary or aromatically stabilized radical.

4. Nitrite rubber according to claim 3, where R, with the proviso that R following homolytic fission to the adjacent atom in the nitrile rubber forms alternatively a secondary, tertiary or aromatically stabilized radical, is alternatively
a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or
a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero) aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

5. Nitrite rubber according to claim 1, having the following general structural elements (ii)

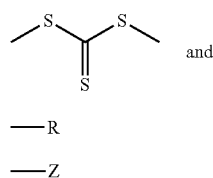

and (III)

—R (II')

—Z (I')

in which

Z possesses the same definitions as in claim 1 and

R possesses the same definitions as in claim 1 for the variant b) with m=0, and R and Z are alike or different, albeit in each case with the proviso that R and Z following homolytic fission of their bond to the respectively adjacent atom in the nitrile rubber each form a secondary, tertiary or aromatically stabilized radical.

6. Nitrile rubber according to claim 5, where R and Z are alike or different and, with the proviso that R and Z following homolytic fission of the bond to the respectively adjacent atom in the nitrile rubber form respectively a secondary, tertiary or aromatically stabilized radical, are a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero) aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

7. Nitrile rubber according to claim 1, having the following general structural elements (ii)

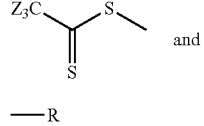

and (VIc-1)

—R (VIc-2)

in which

Z possesses the definitions given in claim 1 and

R possesses the definitions given in claim 1, albeit with the restriction that R, following homolytic fission of the bond to the adjacent atom in the nitrile rubber, forms a secondary, tertiary or aromatically stabilized radical, 8. Nitrile rubber according to claim 7, in which R, with the proviso that R following homolytic fission to the adjacent atom in the nitrile rubber forms a secondary, tertiary or aromatically stabilized radical, is a linear or branched, saturated or mono- or polyunsaturated, optionally singly or multiply substituted alkyl moiety, preferably a corresponding $C_3$-$C_{20}$-alkyl moiety, more particularly sec-butyl, tert-butyl, isopropyl, 1-buten-3-yl, 2-chloro-1-buten-2-yl, propionic acid-2-yl, propionitrile-2-yl, 2-methylpropanenitrile-2-yl, 2-methylpropionic acid-2-yl or 1H,1H,2-keto-3-oxo-4H,4H,5H,5H-perfluoroundecanyl, or a saturated or mono- or polyunsaturated, optionally singly or multiply substituted carbocyclyl or heterocyclyl moiety, more particularly cyclohexyl, cumyl or cyclohexane-1-nitrile-1-yl, a (hetero)aryl moiety, very preferably a $C_6$-$C_{24}$-(hetero) aryl moiety, more particularly phenyl, pyridinyl or anthracenyl, a (hetero)aralkyl moiety, very preferably benzyl, phenylethyl or 1-methyl-1-phenyleth-2-yl, or thiocarboxyl, carbonyl, carboxyl, oxo, thioxo, epoxy, and also salts of the aforementioned compounds.

9. Nitrile rubber according to any of claims 1 to 8, use being made as conjugated diene of at least one ($C_4$-$C_6$) conjugated diene, preferably 1,2-butadiene, 1,3-butadiene, isoprene, 2,3-dimethylbutadiene, piperylene or mixtures thereof, and use being made as α,β-unsaturated nitrile of at least one ($C_3$-$C_5$) α,β-unsaturated nitrile, preferably acrylonitrile, methacrylonitrile, ethacrylonitrile or mixtures thereof, and, optionally, one or more further copolymerizable termonomers selected from the group consisting of aromatic vinyl monomers, preferably styrene, α-methylstyrene and vinylpyridine, fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, copolymerizable anti-ageing monomers, preferably N-(4-anilinophenyl)acrylamide, N-(4-anilinophenyl)methacrylamide, N-(4-anilinophenyl)cinnamides, N-(4-anilinophenyl)crotonamide, N-phenyl-4-(3-vinylbenzyloxy) aniline and N-phenyl-4-(4-vinylbenzyloxy)aniline, non-conjugated dienes, preferably 4-cyanocyclohexene and 4-vinylcyclohexene, alkynes, preferably 1-butine and 2-butine, α,β-saturated monocarboxylic acids, their esters and amides, α,β-unsaturated dicarboxylic acids, their monoesters and diesters, their corresponding anhydrides and amides.

10. Nitrile rubber according to claim 1, possessing a polydispersity index (=Mw/Mn; where Mw is the weight-average molecular weight and Mn is the number-average molecular weight) in the range of 1.0 to 2.9, preferably 1.1 to 2.8, more preferably 1.15 to 2.7, in particular 1.2 to 2.6.

11. Process for preparing nitrile rubbers, where a) first of all a free-radical polymerization of at least one conjugated diene, at least one α,β-unsaturated nitrile and optionally one or more further copolymerizable monomers is carried out in the presence of at least one organic solvent and at least one modifier, and b) optionally, subsequently, a hydrogenation, where use is made as modifier in step a) of at least one compound of the general structural formula (VI),

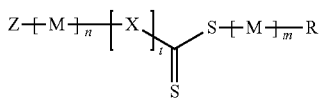
(VI)

in which

Z is, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxyl, sulphinyl, sulphono, sulphino, sulpheno, sulphonic acids, sulphamoyl, silyl, silyloxy, nitrile, carbonyl, carboxyl, oxycarbonyl, oxysulphonyl, oxo, thioxo, borates, selenates, epoxy, cyanates, thiocyanates, isocyanates, thioisocyanates and isocyanides, R (a), if m≠0, possesses the same definitions as the moiety Z, and
 (b), if m=0, is, a linear or branched, saturated, mono- or polyunsaturated alkyl moiety, a saturated, mono- or polyunsaturated carbocyclyl or heterocyclyl moiety, aryl, heteroaryl, arylalkyl, heteroarylalkyl, alkoxy, aryloxy, heteroaryloxy, amino, amido, carbamoyl, akoxy, aryloxy, alkylthio, arylthio, sulphanyl, thiocarboxyl, sulphinyl, sulphono, sulphino, sulpheno, sulphonic acids, sulphamoyl, carbonyl, carboxyl, oxycarbonyl, oxysulphonyl, oxo, thioxo, epoxy, cyanates, thiocyanates, isocyanates, thioisocyanates or isocyanides, M stands for repeating units of one or more mono- or polyunsaturated monomers comprising conjugated or non-conjugated dienes, alkynes and vinyl compounds, or for a structural element which derives polymers comprising polyethers, more particularly polyalkylene glycol ethers and polyalkylene oxides, polysiloxanes, polyols, polycarbonates, polyurethanes, polyisocyanates, polysaccharides, polyesters and polyamides, n and m are alike or different and are each in the range from 0 to 10 000, t is 0 or 1, if n=0, and is 1, if n≠0, and X is $C(Z_2)$, $N(Z)$, $P(Z)$, $P(=O)(Z)$, O, S, $S(=O)$ or $S(=O)_2$, where Z in these moieties possesses the same definitions as set out above for the formula (VI).

12. Process according to claim 11, where use is made in step a) of a modifier selected from the group consisting of
(i) modifiers of the general formula (VIa)

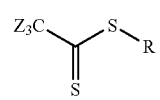
(VIa)

in which the moieties Z and R are able to adopt all of the definitions stated in claim 11,
(ii) modifiers of the general formula (VIb)

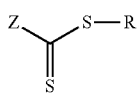
(VIb)

in which

Z possesses the definitions stated above for the general formula (VI) in claim 11, R possesses the definitions stated above for the general formula (VI) in claim 11 for the variant b) with m=0, albeit with the restriction that R following homolytic fission of the S—R bond forms alternatively a secondary, tertiary or aromatically stabilized radical, (iii) modifiers of the general formula (VIc)

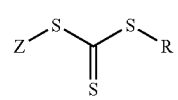
(VIc)

in which

Z possesses the definitions stated for the general formula (VI) in claim 11,

R possesses the definitions stated for the general formula (VI) in claim 11 for the variant b) with m=0, albeit with the restriction that R following homolytic fission of the S—R bond forms alternatively a secondary, tertiary or aromatically stabilized radical, (iv) modifiers of the general formula (VId),

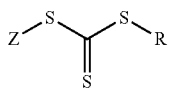
(VId)

in which

Z possesses the definitions stated in claim 11, albeit with the restriction that Z, after the homolytic fission of the S—Z bond, forms a primary radical, and R possesses the same definitions as Z in claim 11, albeit with the restriction that R, following homolytic fission of the S—R bond, forms alternatively a secondary, tertiary or aromatically stabilized radical, and with the additional proviso that Z and R adopt different definitions, and (v) modifiers of the general formula (VIe)

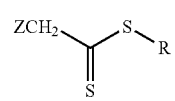
(VIe)

in which

Z can possess all of the definitions stated in claim 11, and

R possesses the same definitions as Z in claim 11, albeit with the restriction that R, following homolytic fission of the S—R bond, forms alternatively a secondary, tertiary or aromatically stabilized radical.

13. Process according to claim 11, where use is made as modifier in step a) of dodecylpropanoic acid trithiocarbonate (DoPAT), dibenzoyl trithiocarbonate (DiBenT), cumyl phenyl dithioacetate (CPDA), cumyl dithiobenzoate, phenyl ethyl dithiobenzoate, cyanoisopropyl dithiobenzoate, 2-cyanoethyl dithiobenzoate, 2-cyanoprop-2-yl dithiophenylacetate, 2-cyanoprop-2-yl dithiobenzoate, S-thiobenzoyl-1H,1H,2-keto-3-oxa-4H,4H,5H,5H-perfluoroundecanethiol or S-thiobenzoyl-1-phenyl-2-keto-3-oxa-4H,4H,5H,5H-perfluoroundecanethiol.

14. Process according to any of claims 11 to 13, where step a) is carried out using an azo initiator of the following structural formulae (Ini-1) to (Ini-6)

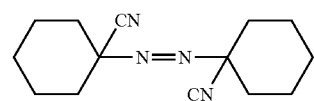
(Ini-1)

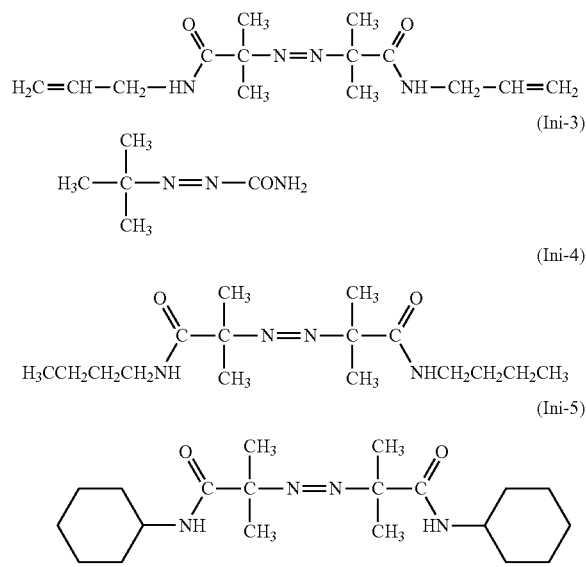

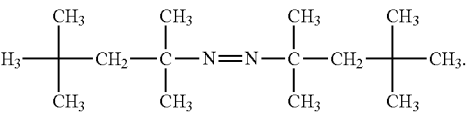

15. Process according to claim 11, where use is made as organic solvent in step a) of dimethylacetamide, monochlorobenzene, toluene, ethyl acetate, 1,4-dioxane, t-butanol, isobutyronitrile, 3-propanone, dimethyl carbonate, 4-methylbutan-2-one, methyl ethyl ketone or methyl tert-butyl ether.

16. Vulcanizable mixtures comprising the nitrile rubber according to claim 1, at least one crosslinker, optionally at least one filler and optionally one or more further rubber additives.

17. Process for producing vulcanisates, characterized in that the vulcanizable mixture according to claim 16 is subjected to crosslinking.

18. Vulcanizates, obtainable by the process according to claim 17.

* * * * *